US012574760B2

(12) United States Patent
O'Shea et al.

(10) Patent No.: US 12,574,760 B2
(45) Date of Patent: Mar. 10, 2026

(54) RADIO EVENT DETECTION AND PROCESSING IN COMMUNICATIONS SYSTEMS

(71) Applicant: DeepSig Inc., Arlington, VA (US)

(72) Inventors: Timothy James O'Shea, Arlington, VA (US); Nathan West, Washington, DC (US); Timothy Newman, Edgewater, MD (US); James Shea, Arlington, VA (US); Jacob Gilbert, Albuquerque, NM (US); Tamoghna Roy, Alexandria, VA (US)

(73) Assignee: DeepSig Inc., Arlington, VA (US)

( * ) Notice: Subject to any disclaimer, the term of this patent is extended or adjusted under 35 U.S.C. 154(b) by 353 days.

(21) Appl. No.: 18/113,201

(22) Filed: Feb. 23, 2023

(65) Prior Publication Data

US 2023/0284048 A1 Sep. 7, 2023

Related U.S. Application Data

(60) Provisional application No. 63/313,043, filed on Feb. 23, 2022.

(51) Int. Cl.
*H04W 24/02* (2009.01)
*H04B 17/336* (2015.01)

(52) U.S. Cl.
CPC .......... *H04W 24/02* (2013.01); *H04B 17/336* (2015.01)

(58) Field of Classification Search
CPC .............................. H04W 24/02; H04B 17/336
See application file for complete search history.

(56) References Cited

U.S. PATENT DOCUMENTS

| | | | | |
|---|---|---|---|---|
| 10,643,153 B2 * | 5/2020 | O'Shea | .................. | G06N 3/082 |
| 10,859,666 B1 | 12/2020 | Kratz et al. | | |
| 2012/0155522 A1 * | 6/2012 | Custer | ................... | H04W 16/22 |
| | | | | 375/224 |
| 2014/0274106 A1 | 9/2014 | Kim et al. | | |
| 2019/0274108 A1 | 9/2019 | O'Shea et al. | | |

(Continued)

FOREIGN PATENT DOCUMENTS

| | | |
|---|---|---|
| CN | 113906719 | 1/2022 |
| EP | 2327178 B1 | 11/2016 |
| WO | WO 2020/068127 A1 | 4/2020 |

OTHER PUBLICATIONS

PCT International Preliminary Report on Patentability in International Appln. No. PCT/US2023/013709, mailed on Sep. 6, 2024, 9 pages.

(Continued)

*Primary Examiner* — Zhiren Qin
(74) *Attorney, Agent, or Firm* — Fish & Richardson P.C.

(57) ABSTRACT

A method includes obtaining, using a specified protocol of a radio access network, low-level signal data corresponding to a radio frequency (RF) signal processed in the radio access network; providing the low-level signal data as input to at least one machine learning network; in response to providing the low-level signal data as input to the at least one machine learning network, obtaining, as an output of the at least one machine learning network, metadata providing information on one or more characteristics of the RF signal; and controlling an operation of the radio access network based on the metadata.

40 Claims, 12 Drawing Sheets

1000

(56) References Cited

U.S. PATENT DOCUMENTS

| | | | | |
|---|---|---|---|---|
| 2019/0348041 | A1 | 11/2019 | Cella et al. | |
| 2020/0082260 | A1* | 3/2020 | Hammoud | G06N 3/0895 |
| 2021/0190905 | A1 | 6/2021 | Roger et al. | |
| 2021/0258866 | A1* | 8/2021 | Chou | H04W 24/02 |
| 2021/0337420 | A1* | 10/2021 | Lo | H04L 41/16 |
| 2022/0014942 | A1* | 1/2022 | Ying | H04W 24/02 |
| 2022/0052885 | A1 | 2/2022 | Luo | |
| 2022/0167236 | A1* | 5/2022 | Melodia | H04W 28/24 |
| 2022/0225264 | A1* | 7/2022 | Song | H04W 8/18 |
| 2022/0232419 | A1* | 7/2022 | Österling | H04L 45/24 |
| 2022/0312211 | A1* | 9/2022 | Arai | H04W 12/50 |
| 2022/0361037 | A1* | 11/2022 | Wei | G06N 3/063 |
| 2023/0308892 | A1* | 9/2023 | Li | H04W 76/20 |
| 2024/0364605 | A1* | 10/2024 | Xu | H04L 41/5067 |

OTHER PUBLICATIONS

PCT International Search Report and Written Opinion in International Appln. No. PCT/US2023/013709, mailed on Jun. 6, 2023, 11 pages.

[No Author Listed], "O-RAN Working Group 2: AI/ML workflow description and requirements," O-RAN Technical Report, O-RAN.WG2.AIML-v01.03, 59 pages.

Baldesi et al. "ChARM: NextG Spectrum Sharing Through Data-Driven Real-Time O-RAN Dynamic Control," CoRR, submitted on Jan. 17, 2022, arXiv:2201.06326v1, 10 pages.

D'oro et al., "OrchestRAN: Network Automation through Orchestrated Intelligence in the Open RAN," Corr, submitted Jan. 14, 2022, arXiv:2201.05632v1, 10 pages.

Extended European Search Report in European Appln. No. 23760643.0, mailed on Jan. 26, 2026, 14 pages.

* cited by examiner

400

700

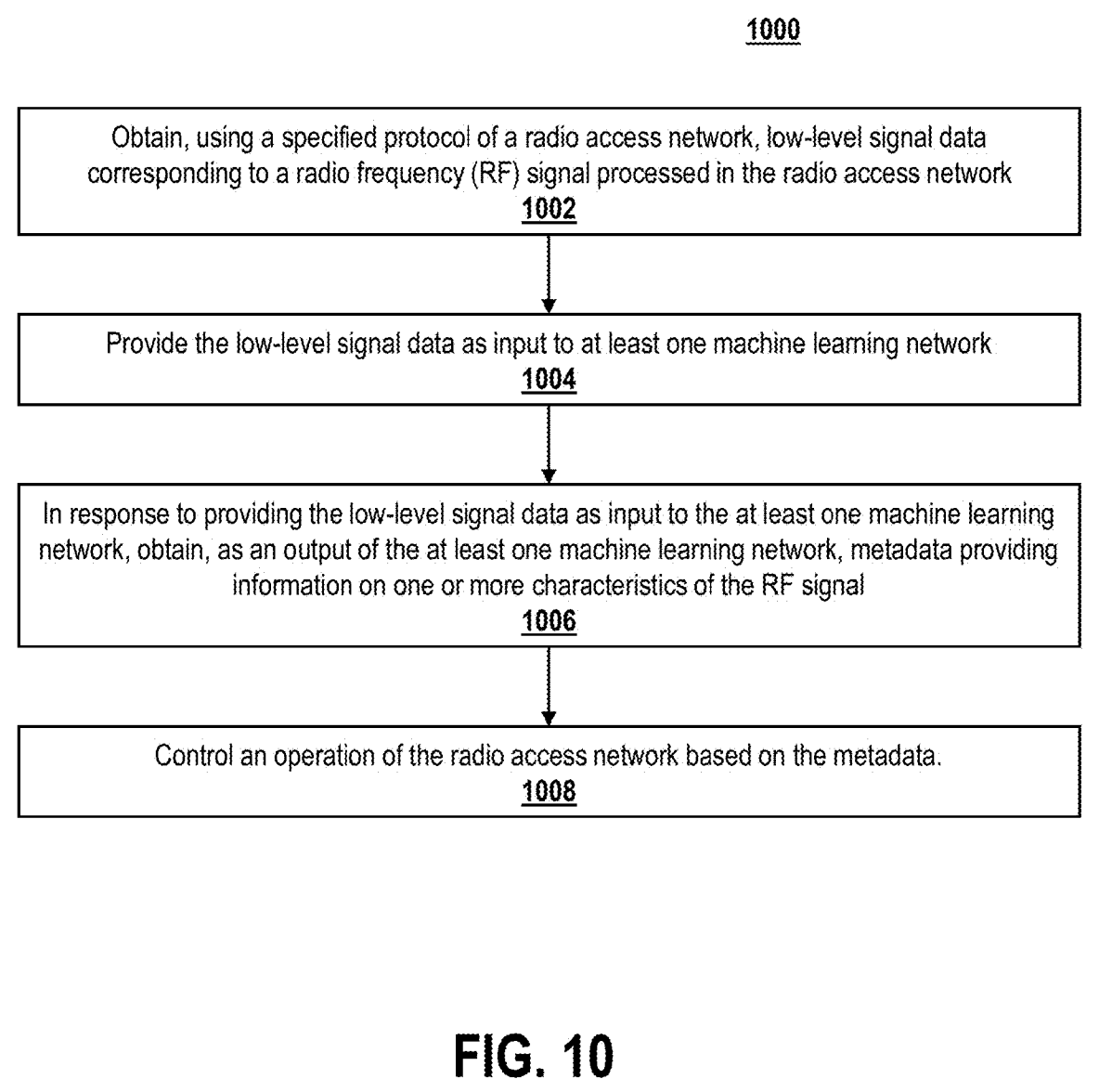

1000

Obtain, using a specified protocol of a radio access network, low-level signal data corresponding to a radio frequency (RF) signal processed in the radio access network
1002

Provide the low-level signal data as input to at least one machine learning network
1004

In response to providing the low-level signal data as input to the at least one machine learning network, obtain, as an output of the at least one machine learning network, metadata providing information on one or more characteristics of the RF signal
1006

Control an operation of the radio access network based on the metadata.
1008

FIG. 10

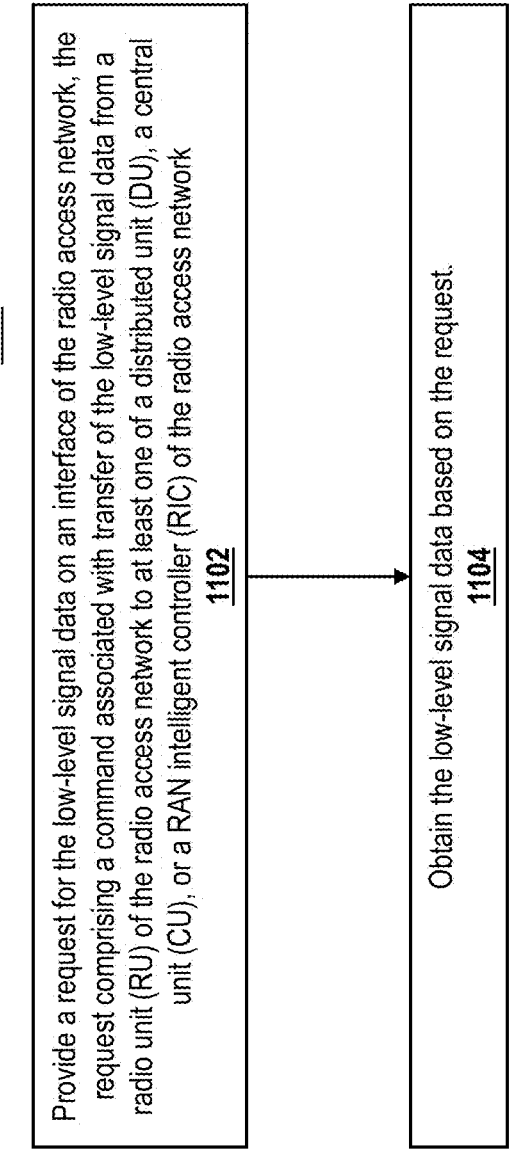

1100

Provide a request for the low-level signal data on an interface of the radio access network, the request comprising a command associated with transfer of the low-level signal data from a radio unit (RU) of the radio access network to at least one of a distributed unit (DU), a central unit (CU), or a RAN intelligent controller (RIC) of the radio access network
1102

Obtain the low-level signal data based on the request.
1104

FIG. 11

RADIO EVENT DETECTION AND PROCESSING IN COMMUNICATIONS SYSTEMS

CROSS-REFERENCE TO RELATED APPLICATIONS

This application claims priority to U.S. Provisional Patent Application No. 63/313,043, filed Feb. 23, 2022, the entirety of which is incorporated herein by reference.

FIELD OF THE DISCLOSURE

The present disclosure relates to signal processing and network control in communications systems.

BACKGROUND

Examples of communications systems include radio access networks (RANs), small communications systems such as small-cell networks and Wi-Fi access point-based networks, and other network types. Radio frequency (RF) signals transmitted using these networks can be analyzed to obtain information about the network environment.

SUMMARY

Some aspects of this disclosure describe a method. The method includes obtaining, by a computer system, using a specified protocol of a radio access network, low-level signal data corresponding to a radio frequency (RF) signal processed in the radio access network; providing, by the computer system, the low-level signal data as input to at least one machine learning network; in response to providing the low-level signal data as input to the at least one machine learning network, obtaining, by the computer system, as an output of the at least one machine learning network, metadata providing information on one or more characteristics of the RF signal; and controlling, by the computer system, an operation of the radio access network based on the metadata.

This and other described methods can have one or more of at least the following characteristics.

In some implementations, obtaining the low-level signal data includes: providing a request for the low-level signal data on an interface of the radio access network, the request including a command associated with transfer of the low-level signal data from a radio unit (RU) of the radio access network to at least one of a distributed unit (DU), a central unit (CU), or a RAN intelligent controller (RIC) of the radio access network; and obtaining the low-level signal data based on the request.

In some implementations, the radio access network has an Open RAN (O-RAN) architecture, and providing the request includes providing the request on an E2 interface of the O-RAN architecture.

In some implementations, the predefined command is a query in a standard protocol of the radio access network.

In some implementations, the method includes executing the at least one machine learning network on a RAN intelligent controller (MC) or on a distributed unit (DU) of the radio access network.

In some implementations, the method includes executing the at least one machine learning network in a zAPP, an xAPP, or an rAPP of the RIC.

In some implementations, obtaining the low-level signal data includes at least one of: obtaining orthogonal frequency division multiplexing (OFMD) grid data originating at a distributed unit (DU) of the radio access network, or providing a call to a management plane of the radio access network to obtain the low-level signal data from a radio unit (RU) of the radio access network.

In some implementations, the method includes executing the at least one machine learning network on user equipment interfacing with the radio access network.

In some implementations, the method includes executing the at least one machine learning network in a radio unit (RU) of the radio access network; transferring the metadata from the RU to at least one of a distributed unit (DU), a central unit (CU), or a RAN intelligent controller (MC) of the radio access network; and controlling the operation of the radio access network from the at least one of the DU, the CU, or the MC.

In some implementations, the low-level signal data includes at least one of time-series I/Q data, frequency domain data, orthogonal frequency division multiplexing (OFDM) data, cyclic prefix-orthogonal frequency division multiplexing (CP-OFDM) data, filter bank-based multicarrier (FBMC) data, or orthogonal time frequency space (OTFS) data.

In some implementations, controlling the operation of the radio access network includes controlling at least one of resource scheduling, band assignment, an antenna parameter, resource block avoidance, a modulation and coding scheme (MCS), spatial re-use, an emission frequency, an emission power, or a beam-steering setting.

In some implementations, the metadata includes at least one of a signal type present in the RF signal, a direction of travel of the RF signal or a component thereof, a location of an emitter of the RF signal or a component thereof, a time of emission of the RF signal or a component thereof, a power of the RF signal or a component thereof, or a protocol of the RF signal or a component thereof.

In some implementations, the method includes, based on the metadata, identifying at least one event including at least one of: a presence of a mobile device interfacing with the radio access network, an anomaly in the RF signal, or an out-of-distribution change in the RF signal.

In some implementations, identifying the anomaly includes: training a second machine learning network on first signal data, the first signal data lacking the anomaly; and applying the second machine learning network to the low-level signal data to identify the anomaly.

In some implementations, the second machine learning network includes an autoencoder.

In some implementations, the anomaly includes a presence of a new emitter represented in the low-level signal data.

In some implementations, the method includes, at a RAN intelligent controller (MC) of the radio access network, receiving, from a plurality of devices interfacing with the radio access network, a plurality of metadata providing information on RF signals received at the plurality of devices, and controlling the operation of the radio access network based on the plurality of metadata.

In some implementations, the method includes identifying a component signal in the low-level signal data using a signal detection machine learning network; providing data representative of the component signal as input to a metadata extraction machine learning network; and determining one or more characteristics of the component signal using the metadata extraction machine learning network.

In some implementations, the method includes, based on the metadata, identifying a presence of interference in the low-level signal data; and based on identifying the presence of the interference, adjusting a configuration of a network device in a vicinity of an emitter of the interference, to mitigate effects of the interference.

In some implementations, the method includes identifying an event based on the metadata; based on identifying the event, labeling the low-level signal data; and updating the at least one machine learning network using the labeled low-level signal data.

In some implementations, the method includes generating a simulation of an environment of the radio access network using the metadata.

In some implementations, the at least one machine learning network includes a first machine learning network configured to identify a component signal in the low-level signal data; and a second machine learning network configured to determine the metadata based on the component signal.

Some aspects of this disclosure describe another method. The method includes providing, by an application executing on a RAN intelligent controller (MC) of a radio access network, a request for low-level radio frequency (RF) signal data on an interface of the radio access network, the request including a command associated with transfer of the low-level RF signal data from a radio unit (RU) of the radio access network to the MC; obtaining the low-level RF signal data at the RIC based on the request; providing the low-level RF signal data as input to at least one machine learning network of the application; and in response to providing the low-level RF signal data as input to the at least one machine learning network, obtaining, by the application, as an output of the at least one machine learning network, metadata providing information on one or more characteristics of an RF signal corresponding to the low-level RF signal data.

This and other described methods can have one or more of at least the following characteristics.

In some implementations, the radio access network has an Open RAN (O-RAN) architecture, and providing the request includes providing the request on an E2 interface of the O-RAN architecture.

In some implementations, the application includes a zAPP, an xAPP, or an rAPP of the RIC.

In some implementations, the query utilizes a standard protocol of the radio access network.

In some implementations, controlling the operation of the radio access network includes controlling at least one of a multiple-input multiple-output (MIMO) configuration of the radio access network or a beam setting of the radio access network based on metadata associated with an emitter of a component of the RF signal Some aspects of this disclosure describe another method. The method includes detecting, at a radio frequency (RF) sensing module of a radio access network, an RF signal; processing the RF signal at the RF sensing module, to obtain a low-level digital representation of the RF signal; providing the low-level digital representation of the RF signal as input to at least one machine learning network executing on the RF sensing module; in response to providing the low-level digital representation of the RF signal as input to the at least one machine learning network, obtaining, at the RF sensing module, as an output of the at least one machine learning network, metadata providing information on one or more characteristics of the RF signal; and in response to a request provided on an interface of the radio access network, transferring the metadata from the RF sensing module to at least one of a distributed unit (DU), a central unit (CU), or a RAN intelligent controller (RIC) of the radio access network.

This and other described methods can have one or more of at least the following characteristics.

In some implementations, the RF sensing module includes a radio unit (RU) of the radio access network or user equipment (UE) of the radio access network.

In some implementations, the radio access network has an Open RAN (O-RAN) architecture, and the request is provided on an E2 interface of the O-RAN architecture.

In some implementations, the low-level signal data includes at least one of time-series I/Q data, frequency domain data, orthogonal frequency division multiplexing (OFDM) data, cyclic prefix-orthogonal frequency division multiplexing (CP-OFDM) data, filter bank-based multicarrier (FBMC) data, or orthogonal time frequency space (OTFS) data.

The foregoing and other methods and processes described herein can be implemented at least as methods, systems, devices, and non-transitory, computer-readable storage media.

In some implementations, machine learning-based analysis of low-level RF signal data (e.g., in-phase and quadrature (I/Q) data) as disclosed by the techniques described herein facilitates flexible detection of various signal events, such as anomalies and unauthorized or unidentified emitters. This analysis can accommodate a wider range of possible detected signals/emitters than alternative methods that rely on higher-level analysis, which may be limited to particular bands and/or protocols. In some implementations, the described machine learning-based analyses are closely integrated into RAN functionality, e.g., using predefined, standardized protocols for RAN-integrated acquisition and analysis of low-level RF signal data. This may improve the efficiency of obtaining signal data and generating metadata, compared to methods that lack utilization of standard protocols and interfaces. In some implementations, based on machine learning analysis built into various RF sensing devices, such as user equipment and radio units, bandwidth associated with signal analysis can be reduced, because reduced-size metadata can be obtained on-unit before being provided to network components that are further in the back end.

The details of one or more implementations are set forth in the accompanying drawings and the description below. Other aspects, features and advantages will be apparent from the description and drawings, and from the claims.

BRIEF DESCRIPTION OF THE DRAWINGS

FIG. 10 is an example of a process according to some implementations of this disclosure.

FIG. 11 is a diagram illustrating an example of a process according to some implementations of this disclosure.

DETAILED DESCRIPTION

This disclosure relates to relates to signal processing and network control in communications systems, for example, using machine learning for radio event detection. Radio frequency (RF) deep signal analysis is natively integrated into network stacks in a manner that facilitates network control based on low-level RF signal derived-metadata, e.g., using built-in protocols of the networks. Accordingly, machine learning-based analysis can be used to control various modules of the networks in an efficient and standardized manner.

Figure 1:
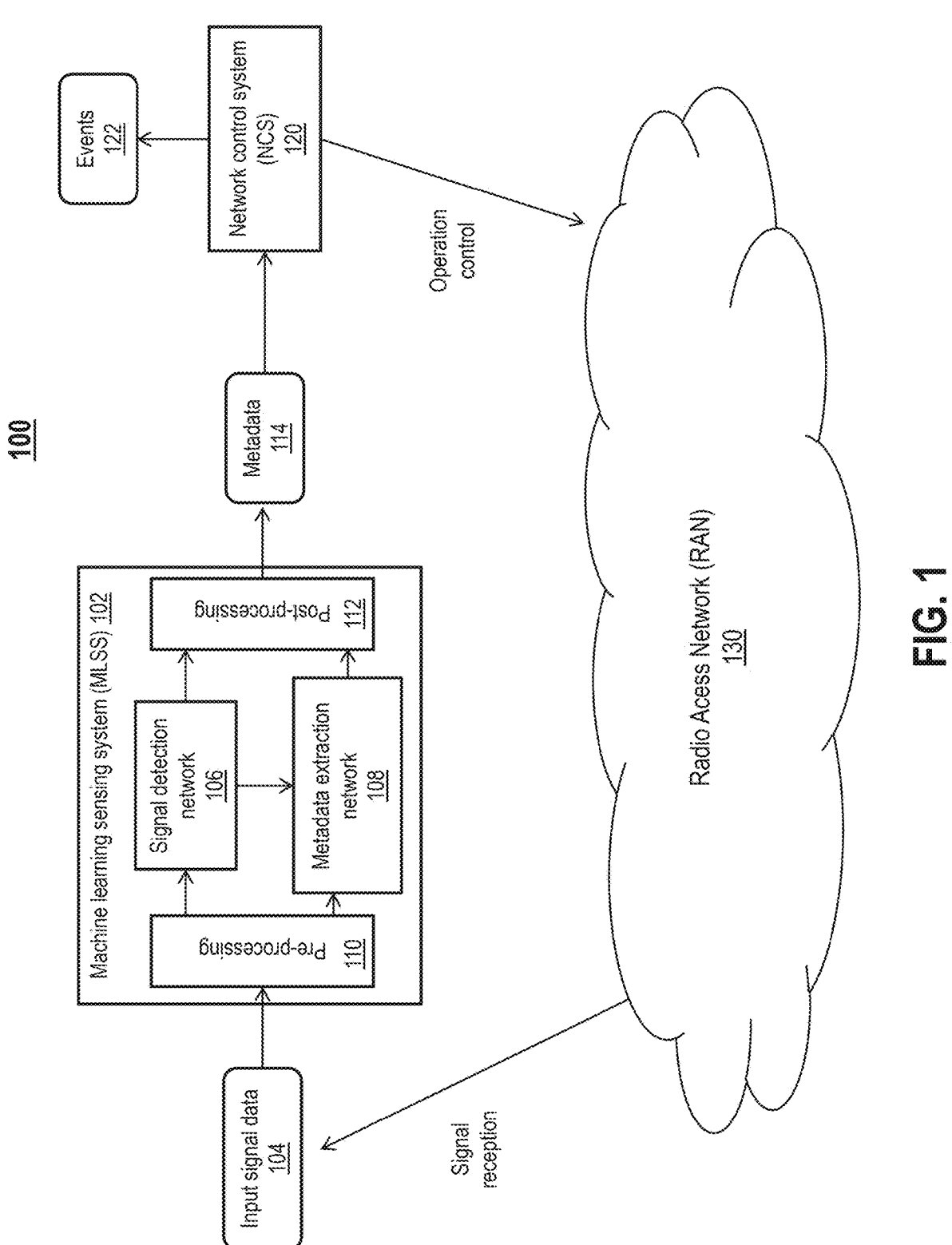
FIG. 1 is a diagram illustrating an example of a network environment.

FIG. 1 illustrates an example of a network environment 100 according to some implementations of this disclosure. The network environment 100 includes a radio access network (RAN) 130, a machine learning sensing system (MLSS) 102, and a network control system (NCS) 120. The MLSS 102 and the NCS 120 are integrated into hardware and/or software modules that interface with and/or form (e.g., as front-end or back-end network modules) RAN 130. Input signal data 104 from the RAN 130 (e.g., low-level RF signal data) is obtained by the MLSS 102 and processed using one or more machine learning (ML) networks, to obtain metadata 114 characterizing the input signal data 104. The metadata 114 is provided to the NCS 120, which controls operations of the RAN 130 based on the metadata 114. Integration of the MLSS 102 and the NCS 120 with the RAN 130 is described in more detail below, e.g., with respect to FIG. 2.

The MLSS 102 is a hardware and/or software-implemented processing module which consumes emissions data (e.g., low-level RF/I/Q sensing information) and converts the emissions data into metadata describing the emissions, e.g., within certain sensing intervals. The MLSS 102 is configured to implement one or more machine learning networks to perform this task. For example, some incorporate a sequence of neural networks and channelization in order to detect, isolate, and classify properties of individual emissions in a band of radio spectrum. Other types of algorithms, such as energy detection, feature extraction, decision trees, support vector machines, and/or other implementations seeking to provide the same or analogous functionality, with different architectures, can instead or additionally be used to implement an MLSS 102.

The input signal data 104 can be low-level signal data, e.g., data directly indicative of RF signals. For example, the low-level signal data can include time-series I/Q data, frequency-domain data (e.g., time-dependent frequency domain data or a frequency domain power spectrum), orthogonal frequency division multiplexing (OFDM) data, cyclic prefix-orthogonal frequency division multiplexing (CP-OFDM) data, filter bank-based multicarrier (FBMC) data, and/or orthogonal time frequency space (OTFS) data. For example Open Fronthaul resource grid data may carry these protocols or bin data, and/or spectrogram data.

The MLSS 102 includes several sub-modules, each of which can be implemented in hardware and/or software: a pre-processing module 110, a signal detection network 106

(which may include one or more ML networks), a metadata extraction network 108 (which may include one or more ML networks), and a post-processing module 112.

The pre-processing module 110 can be configured to operate on the input signal data 104, for example, to normalize, filter, transform, channelize, and/or otherwise manipulate the input signal data 104 before the pre-processed input signal data 104 is provided into machine learning network(s), e.g., networks 106 and/or 108.

The signal detection network 106 is configured to identify one or more signals, emissions, and/or other RF phenomena present within the input signal data 104. The identification can be broadband or within a defined frequency band. For example, in practice, the input signal data 104 may represent a combination of tens, hundreds, or thousands of signals from many corresponding emitters operating at many different frequencies. The signal detection network 106 can be configured to extract, from the input signal data 104, data representative of single signals/emitters, e.g., separated from contributions from other signals/emitters. These extracted signals can then be further processed/analyzed, e.g., by the metadata extraction network 108. In some implementations, the signal detection network 106 is configured to determine timings and/or locations associated with the identified signals, e.g., location(s) at which emitters of the signals were located for emission of the signals. The output of the signal detection network 106 can include the presence of a signal at a given frequency, e.g., "a signal was received at frequency f from time t1 to time t2."

The metadata extraction network 108 is configured to receive, as input, the input signal data 104 and/or signal(s) identified by the signal detection network 106, and determine metadata about the input signal data 104 based on these input(s). For example, the metadata can include one or more signal properties, such as a signal type (for example, a type of communications signal such as cellular signals, 4G signals, 5G signals, 5G Advanced signals, 6G signals, Wi-Fi signals, wireless local area network (WLAN) signals, Internet of Things (IoT) signals, push to talk (PTT) signals, GEO-mobile radio interface (GMR) signals, satellite communication signals, broadcast signals, radar signals, telemetry signals, beacon signals, unintended emissions such as electromagnetic interference (EMI), malicious radio signals such as jamming signals or attack signals), a modulation type, a signal location (e.g., emission location), an emitter type (e.g., type of device), and/or one or more other properties of the signal (for example, channel statistics such as mobility, speed, distance, estimation location, direction of arrival, time of arrival, signal strength, or impulse response). In some implementations, metadata can include brief, selected extracts of low-level signal data, for example, raw I/Q data for a selective time window, where the time window is associated with an identified metadata property of the signal, such as a beginning of the signal, an end of the signal, or a time of increased intensity of the signal.

Outputs of the signal detection network 106 and/or the metadata extraction network 108 can be provided into the post-processing module 112. The post-processing module 112 can be configured to aggregate, analyze, and/or further process the outputs of the networks 106 and/or 108. For example, the post-processing module 112 can aggregate signal detection or regression bins into predicted signal values (e.g., of received signals), select maxima or pseudo-likelihoods out of a network in order to predict properties of signals (e.g., of received signals). The predicted values/ properties, and/or outputs of one or both networks 106, 108, constitute metadata 114, a metadata representation of the input signal data 104 or an aspect thereof. The metadata 114 describes the RF activities and/or emissions present in the input signal data 104, such those described above in reference to the output of the metadata extraction network 108.

The metadata 114 can have various formats, such as JSON, SIGMF, XML, BSON, Protobufs, ASN1, ZMQ, binary structs, etc. The metadata 114, once determined, can be passed to another system/process, such as a service, a communications bus, a network or protocol, and/or the metadata can be stored in a file or in memory. In some implementations, the metadata 114 is a reduced-dimensionality/reduced-size representation of the input signal data 104, such that storage and/or transmission of the metadata 114 is more practical than storage and/or transmission of the input signal data 104.

The signal detection network 106, the metadata extraction network 108, and/or other machine learning network(s) of the MLSS 102, can include one or more types of ML network, such as a convolutional neural network, a residual neural network, a convolutional mixer network, a patch based network, a transformer network, or another type of ML network, which can perform classification or regression to accomplish the described tasks, and which can be trained based on supervised, self-supervised, reinforcement learning-based fine tuning, and/or unsupervised methods in various cases. The networks 106, 108, in some implementations, can be trained and/or configured as described in reference to machine learning networks described in U.S. Pat. No. 10,643,153 (e.g., where "classification information" as described in U.S. Pat. No. 10,643,153 is an example of the metadata 114), the entirety of which is incorporated herein by reference.

The modules of the MLSS 102 are examples; other implementations of the MLSS are also within the scope of this disclosure. For example, the MLSS can not include one or more of the illustrated modules (e.g., not including the pre-processing module 110, the post-processing module 112, the signal detection network 106, and/or the metadata extraction network 108), and/or can include one or more further processing and/or analysis networks besides the ones illustrated. Moreover, the functions described for the MLSS 102 can be implemented in different combinations of modules. For example, pre-processing and/or post-processing can be integrated into the processing of the signal detection network 106 and/or the metadata extraction network 108, and/or the networks 106, 108 can be integrated into one machine learning network, and need not correspond to separate functions or modules. In addition, in any of the implementations described, the MLSS and the NCS can be integrated into a combined hardware and/or software module configured to determine the metadata 114 and identify corresponding events and, in some implementations, control operations of the RAN.

In some implementations, the metadata 114 is provided to the NCS 120. The NCS 120 is configured to control one or more operations of the RAN 130 based on the metadata 114. Moreover, in some implementations, the NCS 120 is instead or additionally configured to further analyze the metadata 114, e.g., to identify events, anomalies, changes, interference, shared band usage, statistics, performance metrics, security threats, and/or other network conditions that may be responded to by controlling the RAN 130. The NCS 120 can operate based on machine learning model(s) and/or predetermined algorithms. For example, the NCS 120 can provide metadata 114 into a machine learning network that is trained to output, based on the metadata 114, whether signal(s) in the metadata represent an anomaly to which the NCS 120 should respond.

Some implementations of the NCS 120 are configured to identify one or more events 122 based on the metadata 114. Events 122 represent the practical consequence of metadata 114. In some implementations, control of the RAN 130 by the NCS 120 (e.g. to mitigate or optimize for coexistence, interference, security events, device changes or malfunctions, etc., by retuning, filtering, adjusting beams or nulls, tilt, power levels, gain or attenuation, resource or scheduling allocations, timings, band assignments, adjusting pilot, modulation or other frame parameters, and/or updating encoding or decoding machine learning models to better operate under present and/or future conditions, etc.) is based on the identification of the one or more events 122. In some implementations, the events 122 include the presence of a new and/or unauthorized emitting device interfacing with the RAN 130 and/or emitting RF signals for reception by a receiver of the RAN 130 (e.g. unauthorized devices, jamming devices, wireless attacks, etc). For example, the metadata 114 can indicate a new signal component in received emissions, and/or the metadata 114 can indicate a signal component having a modulation type, encoding, device type, or other characteristic indicative of a new and/or unauthorized emitting device (e.g. a radar present in a shared band, or communications signal from another device type, air interface standard, or network), based on which the NCS 120 can identify the presence of the new and/or unauthorized emitting device. In some implementations, the events 122 include an anomaly in the RF signal and/or an out-of-distribution change in the RF signal (e.g. abnormal signal activity, signal traffic, signal timing, signal behaviors, signal locations, modes, etc., any one or more of which may indicate underlying risks such as security compromise, software changes, malware, etc.). In some implementations, the events 122 include a device malfunction, e.g., a malfunction of a coupler, a filter, an amplifier, or an antenna. For example, a failing power amplifier can result in power dropping to a low level, and some failure types may result in significant distortion or interference artifacts, or the presence of passive intermodulation (PIM). In some implementations, the events 122 include an interference event.

To improve the efficiency and modularity of metadata determination and/or RAN control, the MLSS and/or NCS, and operations thereof, can be integrated into the functioning of the RAN itself. That is, in some implementations, the general process flow illustrated in FIG. 1 (obtaining signal data, determining metadata using an MLSS, and controlling RAN operations using an NCS) can be performed using RAN-integrated modules and/or RAN functions, e.g., standardized functions in layers of a RAN. It has been recognized, for purposes of some implementations of this disclosure, that this integration can provide benefits for system responsiveness, reliability, and accuracy. Moreover, it has further been recognized that particular implementations of this RAN integration (e.g., based on particular modules, devices, layers, and/or protocols in the context of particular RAN architectures) can provide this integration in more efficient and technically-useful ways.

Figure 2:
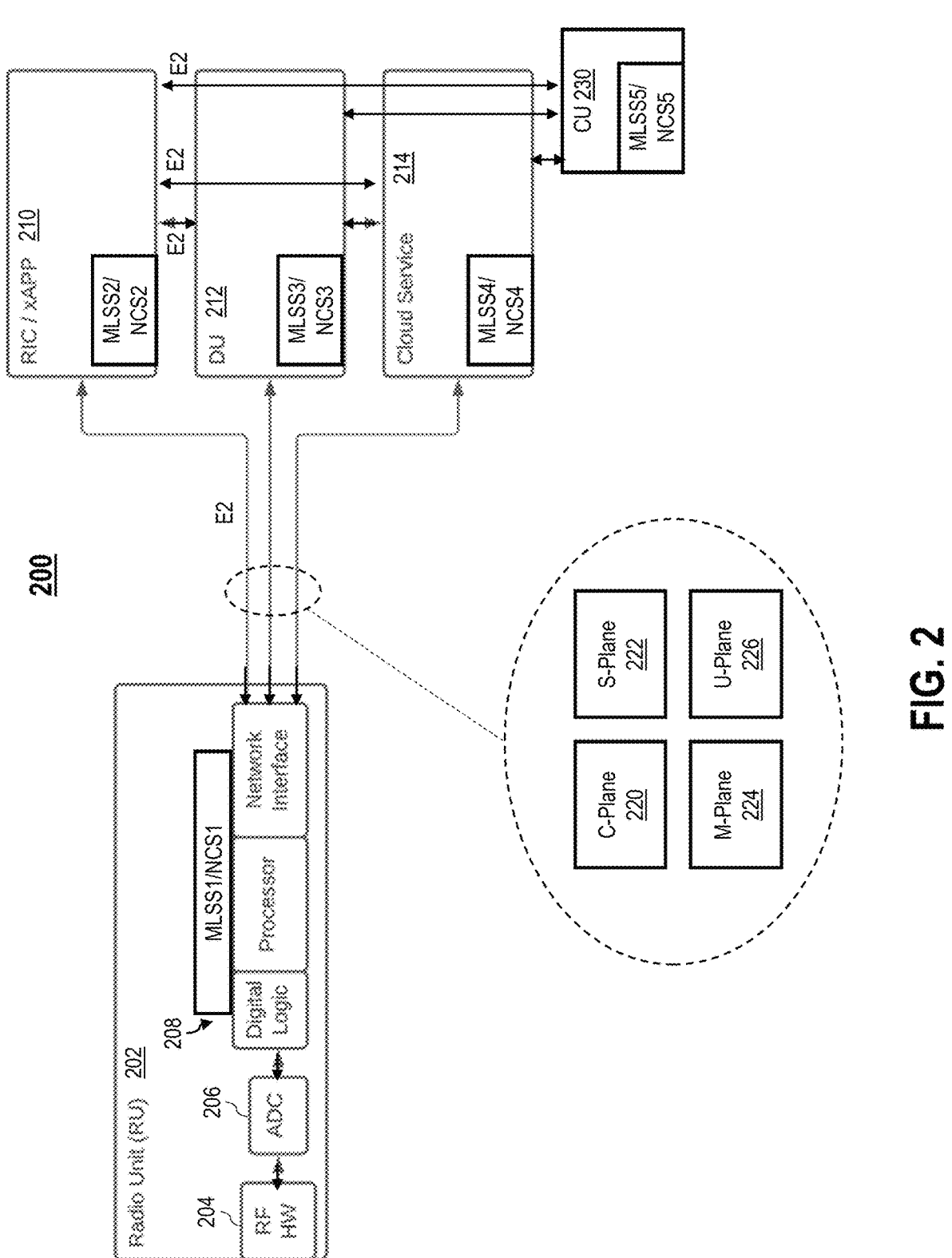
FIG. 2 is a diagram illustrating an example of a RAN architecture.

For example, FIG. 2 illustrates an example of a RAN architecture 200 in which aspects of the network environment 100 can be implemented. The RAN architecture 200 can be, for example, a 4G architecture, a 5G architecture, a 6G architecture, or another cellular architecture, in various implementations. More specifically, in some implementations, the RAN architecture 200 is a virtualized radio access network (vRAN) architecture or an open radio access network (O-RAN) architecture. In a vRAN architecture, network functions are virtualized to allow baseband functions to run on off-the-shelf hardware, such as software servers. For example, network functions can be virtualized in the cloud. O-RAN is an extension of vRAN in which network functions and interfaces are non-proprietary, virtualizable, and interoperable between different suppliers, with a set of unified standards (e.g., pre-defined functions) used to obtain information from and control the O-RAN architecture.

The RAN architecture 200 includes a radio unit (RU) 202, a RAN Intelligent Controller (MC) 210 that can, in some implementations, host one or more xAPPs, rAPPs, and/or zAPPs, a distributed unit (DU) 212, a central unit (CU) 230, and a cloud service 214. The RU 202 is a field-deployed hardware unit including RF hardware 204 configured to receive and/or transmit wireless RF signals (e.g., transceiver(s) and/or antenna(s)), an analog-to-digital converter 206 configured to convert received analog RF signals into a digital form, and an RU computer system 208 configured to process the digital RF signals in one or more ways (e.g., convert the digital RF signals into a packet form suitable for transmission through the RAN architecture 200) and output the processed digital RF signals (along with, in some implementations, other data such as ML-derived metadata, as described in further detail below) to other components of the RAN architecture 200.

The DU 212 is a base station unit, e.g., forming a portion of a 5G-gNB. The DU 212 provides support for lower layers of the RAN protocol stack such as radio link control (RLC), medium access control (MAC) and physical layer. The DU 212 can include discrete hardware (e.g., as a base station device located physically near the RU 202) and/or can be wholly or partially virtualized. The DU 212 works in conjunction with the CU 230, which forms another portion of the base station unit. The CU 230 may be integrated, for example, into the cloud service 214 and/or other computer system(s). The CU 230 provides support for higher layers of the RAN protocol stack such as service data adaption protocol (SDAP), packet data convergence protocol (PDCP) and radio resource control (RRC), and interfaces with core network elements, such as the 5G Core. The CU 230 can be located further from the RU 202 than the DU 212, e.g., as a back-end or mid-level hardware and/or software component, and can be wholly or partially virtualized.

The RIC 210 is a services layer that sits over the DU 212 and the CU 230 to perform control, optimization, and tuning of RAN functions. The RIC 210 can be divided into a non-real-time RIC and a near-real-time RIC. In some implementation, the non-real-time-RIC provides greater than one-second latency control of RAN elements and their resources, while the near-real-time RIC regulates actions that take between 10 milliseconds to one second to complete; these latency requirements can vary depending on the target timeline for sensing and recognition and reaction in the RAN architecture 200. In some implementations, the non-real-time RIC exchanges data with the near-real-time RIC (e.g., over an A1 interface), and the near-real-time RIC exchanges data with the DU 212 and the CU 230, e.g., over an E2 interface. The RIC 210 can be wholly and/or partially virtualized, e.g., as a hardware and/or software module. Some implementations of the RIC 210 can include a real-time RIC for real-time operations.

Operations of the RIC 210 can be performed using xAPPs, which reside in/execute on the near-real-time RIC. xAPPs are software tools/plugins, e.g., which can be cloud-native microservice-based applications. xAPPs operate using a public protocol, such that xAPPs can be developed by third-parties for use in the RAN architecture 200. In an example of an interaction between the RIC 210 elements and the DU 212/CU 230, the non-real-time RIC provides network metrics to the near-real-time RIC over an A1 interface. An xAPP executing in the near-real-time RIC obtains the network metrics and processes the network metrics to determine one or more control parameters for edge control of RAN elements, e.g., control of the DU 212 and/or the RU 202. The xAPP sends commands to the DU 212 over an E2 interface to actualize the control parameters. rAPPs and zApps, analogous to xAPPs, reside in/execute on the non-real-time RIC or in a real-time RIC respectively.

The cloud service 214 represents back-end distributed computing functions. For example, the cloud service 214 can implement core network functions (e.g., 5G-Core functions), IP Multimedia Subsystem (IMS) functions, and/or other network-related functions. The cloud service 214 can include, for example, an edge-cloud, a regional-cloud, and/or a national-cloud.

In some implementations, data transfer, operations control, and RAN communications are performed in one or more planes of the RAN architecture 200. Planes represent functional divisions of RAN operations. In the case of an O-RAN RAN architecture 200, the planes include: a Control Plane (C-Plane) 220 for real-time control between DU 212 and RU 202; a Management Plane (M-Plane) 224 for non-real-time management operations between the DU 212 and RU 202; a Synchronization Plane (S-Plane) for traffic to a synchronization controller; and a User Plane (U-Plane) 226 for I/Q sample data transfer between DU 212 and RU 202 (e.g. Fronthaul). One or more of these planes can be used to obtain low-level signal data, transfer determined metadata, and/or control RAN operations. For example, the C-Plane 220 can be accessed via an E2 interface to capture/transfer data (such as low-level signal data or metadata) from the RU 202 or DU 212 to an MLSS, which can execute in an xAPP or elsewhere. As another example, an M-Plane 224 function can be used to access captures of low-level signal data (such as I/Q data) from the RU 202 or DU 212, e.g., for use by an MLSS and/or for lower-date-rate diagnostic purposes The M-Plane 224 can also be accessed by applications on the RIC 210 for management of the DU 212 and/or the RU 202.

The NCS 120 can control operations in one or more portions of the RAN 130/RAN architecture 200, varying from RF hardware configuration to back-end resource allocation. Specific examples of operation control are provided below. To control the operations, an NCS 120 can provide a command by a suitable protocol of the RAN architecture 200. For example, an NCS 120 can access an applicable plane of the RAN architecture 200 (such as the C-Plane 220 and/or the M-Plane 224) and provide, on the plane, a command that causes the target operation determined based on the metadata 114, e.g., an adjustment of one or more parameters, execution of one or more operations, etc.

As shown in FIG. 2, one or more MLSS (e.g., having characteristics as described in reference to MLSS 102) and/or one or more NCS (e.g., having characteristics as described in reference to NCS 120) can be integrated into the RAN architecture 200 in one or more of the RU 202 the RIC 210 (e.g., in an xAPP), the DU 212, the CU 230, or the cloud service 214. That is, in various implementations, determination of RF signal metadata using machine learning can be performed at one or more of these modules, and control of operations of the RAN architecture 200 can be performed at one or more of these modules. Control by the NCS can be local/intra-module (e.g., an NCS in a first module can control operations of the first module, such as when NCS1 determines a target antenna power and controls the RF HW 204 to have the target antenna power) and/or cross-module (e.g., the target antenna power can be determined by another NCS, such as NCS3 in the DU 212, which provides a command on the C-Plane to set the target antenna power in the RU 202). In addition, communication between an MLSS and an NCS can be local/intra-module (e.g., MLSS2 determining metadata, and NCS2 controlling RAN operations based on the metadata), and/or cross-module (e.g., MLSS5 determining metadata, and NCS3 controlling RAN operations based on the metadata).

In some implementations, an MLSS (MLSS1) is deployed on the RU 202. In some implementations, the RU 202 can include an embedded computational unit, such as the RU computing system 208, having computational resources that is close to an antenna (e.g., the closest embedded unit to the antenna). Accordingly, deployment of MLSS1 on the RU 202 allows for access to raw digitized sample data (e.g. in-phase and quadrature (I/Q) data) from the ADC 206 of the RU 202, and the raw digitized sample data need not be transported elsewhere for the purpose of sensing/processing by MLSS1. For example, MLSS1 can be deployed on the RU computing system 208, and the RU computing system 208 can include a field programmable gate array (FPGA), application-specific integrated circuit (ASIC), tensor cores or AI-Engine/Math-Engine, and/or CPU/GPU/NPU processor(s). MLSS1 can be configured to perform signal detection and extraction of parameters of the detected signals, as described for MLSS 102. The RF HW 204 can include a digitizer used to receive uplink signals for clients or user equipment (UEs) accessing the sector. Alternatively, or in addition, in some implementations, an additional RF HW path or tuner may be included in the RU 202 and used to scan for emissions in other bands or frequencies. In some cases, a scheduler may allow for the re-use of an RF path during specific time periods for observations of other bands. Accordingly, based on fixed and/or variable scanning by the RF HW 204, the MLSS1 can obtain low-level RF signal data for determination of RF metadata.

MLSS1, when present, is resident at least partially on hardware of the RU 202 hardware (e.g., all or some of the MLSS1 computation is conducted on processing hardware inside the RU 202), and generates a set of post-detection metadata describing signals, detections, events, and/or emissions the MLSS1 has observed. In some implementations, full MLSS processing is performed by the RU computing system 208, e.g., solely on an FPGA of the RU computing system 208, or on a mixture of FPGA, GPU, and/or CPU or other computing platforms.

In some implementations, only a portion of MLSS processing is performed on the RU 202. For instance, only pre-processing, the pre-processing as well as a detection function, or some other subset of MLSS processing can be performed on the RU 202, with the remaining portion of the MLSS processing split onto MLSS of one or more other platforms, such as MLSS2 on the RIC 210, MLSS3 on the DU 212, MLSS4 on the cloud service 214, and/or MLSS5 on the CU 230. Metadata determined by the MLSS1 can be passed over an interface to another network component (e.g., passed over an Ethernet connection, an Open FH protocol, an Open FH M-Plane, an E2 Link, or another protocol), e.g., to NCS2, NCS3, NCS4, and/or NSC5 for control of RAN operations by NCS2, NCS3, NCS4, and/or NSC5. The metadata can instead or additionally be used within the RU 202 itself by NCS1, in order to effect change to the communications system of the RU 202, such as adjusting antenna pattern, power levels (e.g., emission power levels), pointing, filtering (e.g., analog and/or digital filtering), and/or other parameters of the communications system, for example, to avoid interfering emitters or to null out or suppress detected interfering emitters from interfering with intended traffic and emissions.

In some implementations, one or more interfaces such as a network protocol, streaming protocol, REST service, or other data transport service may be provided over a data or management interface to the RU 202, which can be queried to provide, and/or can actively provide, streaming or periodic signal data (e.g., I/Q data and/or another type of low-level signal data described herein) from the RU 202 to one or more other components of the RAN architecture 200. For example, MLSS4 can execute on the cloud service 214 and can process signal data from the RU 202 at a desired rate to provide signal detection and/or parameter/metadata extraction, reducing processing burdens placed on the RU 202 and/or on other components of the RAN architecture 200 for metadata determination, such as the DU 212. In some implementations, the cloud service 214 can interface with the RU 202, to obtain low-level signal data, by one or more intermediary nodes, such as an application on the DU 212 and/or an E2-Node.

Accordingly, MLSS4 can access low-level signal data obtained by the RU 202. This data can come from an alternative RF HW on the RU 202 (e.g., dedicated hardware for sensing RF signals for metadata determination) and/or can come from a primary uplink RF HW 204 on the RU, for example, by capturing physical uplink shared channel (PUSCH) data and/or other data digitized by the RF HW 204 and ADC 206 on the RU 202. In some implementations, NCS4 can obtain metadata determined by the MLSS4 and/or another MLSS and control operations based on the metadata, e.g., resource allocation by the RAN core.

In some implementations, MLSS2 and/or NCS2 is hosted on the RIC 210, e.g., in an xAPP, zAPP, and/or rAPP. This hosting can, in some implementations, be advantageous, as it is compatible with a multi-vendor platform in which the application can be hosted off the core RAN hardware components, e.g., in an arbitrary data center which may be local or regional and which may have ample physical space, storage capacity, bandwidth, computing resources, power supply, and cooling, which may be lacking in edge components. Accordingly, an MLSS and/or NCS hosted in a RIC 210 application can, in some cases, have little or no negative impact on the performance of edge components and can be provided with little or no change in the configuration of the edge components to support the MLSS and/or NCS. This can be useful, for example, in brownfield networks where RU/DU components are already selected and/or locked down and may be difficult to reconfigure. Moreover, the RIC-hosted applications, in some implementations, can use an interoperable, open interface, such as an E2 interface, in order to communicate with downstream components; can share or combine data between multiple sectors or networks, having access to cross-sector/cross-network data transfer; and/or can leverage additional AI/ML and/or logic in order to process or combine outputs from the MLSS with other data sources, actions or logic. The hosting location(s) of the MLSS2 and/or NCS2 can depend on the desired latency of metadata determination and/or RAN control. For example, for low-latency sensing and/or control tasks (e.g., near-real-time antenna reconfiguration), MLSS2 can be executed by a zAPP or an xAPP on the real-time/near-real-time RIC, and, for higher-latency sensing and/or control tasks (e.g., posthoc network traffic analyses) MLSS2 can be executed by an rAPP on the non-real-time RIC.

The input signal data 104, such as I/Q samples and/or OFDM grid data, can be carried to the RIC 210 (for analysis by MLSS2) over a protocol such as, for example, an E2 interface and/or a RIC Message Router (RMR), the input signal data 104 being transmitted from the RU 202, DU 212, CU 230, and/or an E2 Node to the zAPP, xAPP or rAPP. The MLSS2 application can then generate outgoing messages or communications, such as RMR, F1, E2, A1, and/or O1 messages, to provide the determined metadata to other portions of the RAN architecture. In some implementations, the messages can be provided by the NCS2 to control operations such as scheduling, avoidance of certain resource blocks in time or frequency, adjustment of cell antenna patterns of parameters, adjustments of the modulation and coding scheme (MCS) or other PHY parameters, power levels, and/or other types of allocation or adjustments based on sensed activity in the RF spectrum. In some implementations, these messages can be encoded using ASN1, ZMQ, JSON, protobufs, structs, or another data format.

In any of the implementations described herein, MLSS/NCS-associated data transfer operations, such as obtaining/requesting input signal data 104, providing/requesting/obtaining metadata 114, and/or controlling operations based on the metadata 114, can be performed using standardized, built-in protocols of the RAN architecture 200, e.g., on the E2 interface (e.g., a particularly-configured E2 Service Model (SM) which provides portions of low-level signal data and raw sample data such as received OFDM grids, I/Q samples, channel state information, channel response estimates, etc., to other network elements in a standardized manner). For example, in some implementations, to obtain the input signal data 104, an MLSS can output a predefined command associated with MLSS operation, e.g., using the U-Plane 226 or the M-Plane 224. For example, the input signal data 104 can be OFDM grid data at or from the DU 212, or obtained from the RU 202 using a call to the M-Plane. This predefined command (e.g., to obtain I/Q data by an MLSS on the RIC 210, DU 212, or CU 230) may not be present in some RAN schemes, which may lack standardized protocols for analyzing low-level sensing data. By incorporation of the predefined command as a standard element of the RAN protocol, MLSS operations can be more efficiently integrated into the RAN stack. Moreover, the incorporation of the predefined command can facilitate interoperable multi-vendor operation, for example, allowing a RIC xAPP which can operate with multiple RU and DU vendors to support MLSS operation, allowing for cross-network operators and improved cost efficiencies. Other examples of predefined commands, requests, and queries include commands, requests, and/or queries to obtain or transfer determined metadata, e.g., from the RU 202 to the RIC 210, DU 212, or CU 230. For example, an E2 query can use an E2 polling model or an E2 subscription model, with examples of these queries for metadata being, respectively "send_me_metadata_now" and "subscribe_me_to_metadata_streams_in_the_future," both being predefined commands associated with metadata transfer.

Other examples of standard operations that can be incorporated in implementations of this disclosure can include standard interfaces which allow for improved power control, scheduling, beam control, band control, cell parameter tuning, multiple-input and multiple-output (MIMO) user pairing, tuning of the receiver for different users, controlling frame parameters such as pilots, cyclic prefix, modulation coding scheme (MCS), or resource grid locations or properties for one or more users within one or more sectors based on information, such as metadata and detected events (e.g., channel state data, performance indicators, interference detections, malicious activity detections, jamming detection, EMI etc.) gleaned from low-level signal data. The standard interfaces and/or standard commands on the interfaces can be used by the RIC 210, DU 212, CU 230, or another module (e.g., hosting an NCS) to control network operations based on MLSS operations.

In some implementations, MLSS3 can be deployed directly onto the DU 212. In such implementations, the DU 212, which receives front-haul (FH) and/or Open-Front-Haul (O-FH) data from the RU 202, can be used to execute the MLSS3 application in order to derive sensing information (input signal data 104) from the front-haul data stream itself (e.g., on the U-Plane 226), and/or the DU 212 may communicate with another interface (e.g. management interfaces or other control plane interfaces) on the RU 202 over a network interface in order to obtain a side-stream (e.g., this can include I/Q data snippets as the input signal data 104, where the main Open-Fronthaul (O-FH) stream includes OFDM Grid data, e.g., in a 7.2× deployment scenario). MLSS3, being on the DU 212, has low-latency access to components of the DU 212 such as physical and MAC layers, allowing MLSS3 to inform these layers of the surrounding environment, e.g., provide determined metadata to these layers. This information can then be used to make decisions on how to adapt to achieve optimal performance for the communications system. For example, NCS3 on the DU 212 can control operations of the DU 212 based on metadata determined by MLSS3.

Accordingly, using one or more of MLSS1, MLSS2, MLSS3, MLSS4, or MLSS5, as shown in FIG. 2, the MLSS can provide metadata about the RF environment. Based on this knowledge, one or more of NCS1, NCS2, NCS3, NCS4, or NCS5 can determined improved adaptions to be made on the RU 202, DU 212, CU 230, RIC 210, and/or downstream in the core or cloud services or applications.

Implementations according to this disclosure are not limited to MLSS and/or NCS deployment on RAN equipment as shown in FIG. 2. Instead, or in addition, in some implementations one or more MLSS and/or NCS can be deployed in user equipment (UE).

Figures 3A, 3B, 3C:
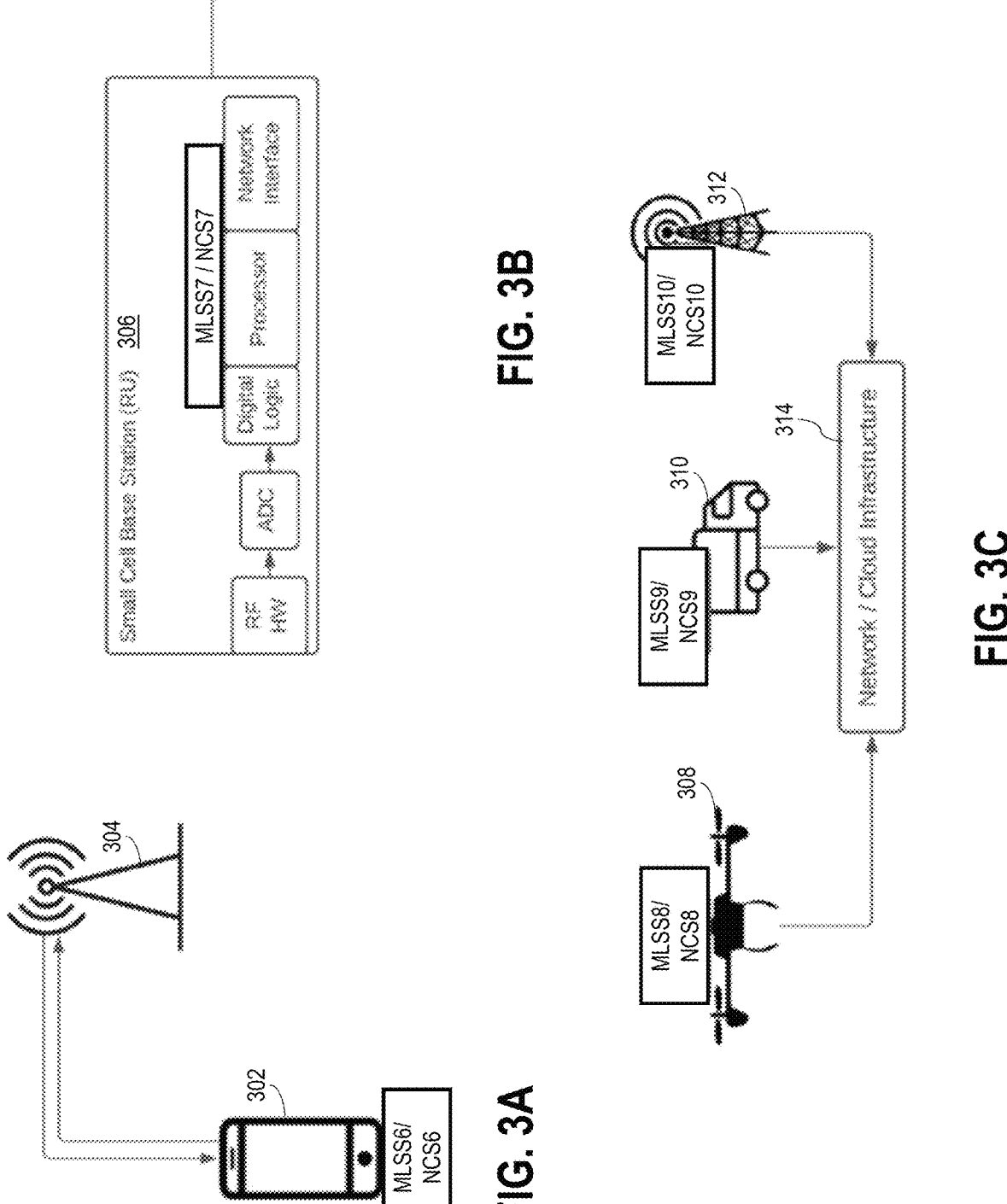
FIGS. 3A-3C are diagrams illustrating examples of machine learning sensing system deployment.

For example, as shown in FIG. 3A, MLSS6 is deployed on UE 302, e.g., a smartphone, wearable device, laptop, tablet, vehicle, Internet of Things (IoT) device, wearable device, or personal computing device. In some implementations, networking components on the UE 302 are used to obtain I/Q data, which may be processed locally using the MLSS6 application running on the UE 302, and/or which may be transmitted in a raw form (such as I/Q data) back to a more-central application over a network interface such as a cellular RAN for processing by an MLSS (such as MLSS7) that is, in some implementations, included in infrastructure 304.

As increasingly dense 5G, 5G Advanced and 6G sectors are deployed with more and more devices sharing spectrum using spatial re-use such as in multiple-input and multiple-output (MIMO) and Massive MIMO systems, the inclusion of MLSS6 in UE 302 can improve network performance, e.g., because the UE 302 can report back metadata, such as interference and emissions in and/or outside of operating bands (as determined by MLSS6), back to the network for processing. In some implementations, MLSS6 has data indicating a location of the UE 302, and MLSS6 is configured to correlate specific identified signals to specific locations, allowing predictive adaptations on the UE 302 and/or in network infrastructure such as one or more modules shown in FIG. 2. This can then provide benefit for network control by NCS(s). For example, based on metadata determined by MLSS6, NCS6 and/or another NCS can control one or more network operations, such as future network planning, band assignment by the UE 302 and/or another UE, resource scheduling by the UE 302 and/or network infrastructure, and/or spatial-re-use or beam planning within a sector of the network (e.g., the sector in which the UE 302 is located). For example, based on the metadata, the NCS(s) can identify one or more interfering emitters whose signal(s) are identified, by MLSS6, in RF data received at the UE 302. To reduce interference, the NCS(s) can alter one or more network parameters, such as a frequency used in the network, resource grid, slice or bandwidth part allocations, scheduling, MIMO user pairing, learned encoding or decoding models, an emission power level in the network, adjustments to filters, antennas, or RF components, and/or an adjustment to beam-steering or nulling by one or more antennas of the network. As a result, network performance can be improved, for example, improved sum-rate of multi-users and/or other criteria such as high reliability for critical communications and allocations such as ultra-reliable low latency communications (URLLC).

As shown in FIG. 3B, a small cell base station 306 can include components as described for the RU 202 of FIG. 2. Optionally, the small cell base station 306 can implement DU signal processing functions for the low-physical-layer (low-PHY) as well as, in some implementations, the high-PHY. The small cell base station 306 can include circuitry to implement these functions in a single unit for deployment. In some implementations, the small cell base station 306 can perform some or all CU and/or packet level processing and scheduling (i.e. MAC, RLC, and/or PDCP functions, in some implementations in addition to PHY and/or RF processing). Such processing can take the form of deployment scenarios such as Split 6 with an nFAPI interface and/or split-2 over an F1 interface, or other types of splits.

In some implementations, it can be desirable to perform MLSS processing on the small cell base station 306, for example, because mid-haul or back-haul data interfaces from the small cell base station 306 may be more bandwidth-limited or higher latency than a typical front-haul interface. For example, bandwidth limits and/or higher latency can be present in various integrated backhaul, satellite backhaul, or home-internet based backhaul deployments not meant to support full macro-cell capacity. Metadata determined on the small cell base station 306 can have smaller dimensionality (and reduced size) compared to the input signal data from which the metadata is determined, alleviating the burden placed on these limited-bandwidth connections when the metadata is transferred from the small cell base station 306 to associated network infrastructure. In addition, placement of small cell base stations (such as Femtocells, Picocells, Microcells, etc.) may be less well-planned and controlled than that of macro-cells, such that the likelihood of interference, co-channel interference, jamming, and/or other types of radio interference, distortion, and/or degradation may be more likely to occur for small cell base stations. Moreover, small cell base stations are more likely to be deployed in shared or unlicensed spectrum bands where interference and different emitters or technologies are likely to be present.

By providing MLSS7 within the small cell base station 306 (where the MLSS7 may run continuously, during deployment only, and/or periodically to monitor performance), metadata as described throughout this disclosure can be extracted from the RF spectrum detected by the RF HW of the small cell base station 306. Based on the metadata, NCS7 on the small cell base station 306 and/or other infrastructure-integrated NCS(s) as shown in FIG. 2 can adjust device placement, network scheduling, band allocation, power control, antenna configuration, and/or other network parameters. Based on its location, MLSS7 has ready access to raw signal data (e.g., without using large amounts of bandwidth to transmit raw signal data to other network components) that can be used to determine signal metadata.

Based on metadata determined by MLSS7 and/or another MLSS, NCS7 and/or another NCS can identify one or more events (e.g., unauthorized nearby emissions, failures of RF hardware devices, and/or malfunctions of RF components) and perform network control based on the events. Because of its execution in the small cell base station 306, MLSS7, in some implementations, can help to reduce RF as a source of network problems, allowing faster response to the causes of network degradation. This can help automate the diagnosis, deployment, and optimization of small cell systems (e.g., by NCS7 and/or another NCS) without heavy manual expert diagnosis and debugging of complex RF system effects.

FIG. 3C illustrates further examples of deployments of an MLSS and/or NCS on common platforms. The MLSS can be deployed in conjunction with a communication system and/or as a dedicated RF sensing system. Here, MLSS8 and/or NCS8 is deployed on a sensing platform 308, such as an autonomous vehicle or a drone such as a UAV, which may collect RF using special purpose radio hardware and/or by sharing radio hardware with a communications system of the sensing platform. For sensing platforms, storage of raw I/Q data may be impractical because of the significant storage space used, and/or transmission of the raw I/Q data from the sensing platform may be impractical because of the large bandwidth consumed in the transmission. Executing MLSS8 on the edge platform (the sensing platform) can allow for storage of signal collection metadata and/or transmission of this metadata over a communications link to infrastructure such as a network or cloud system (e.g., as described in reference to FIG. 2), which can further process or fuse this information together and/or control a network based on the information. In some implementations, metadata from MLSS8 may feed into a vRAN/O-RAN. For example, metadata determined by the MLSS8 can indicate emitter and propagation performance to be used (e.g., by NCS2, NCS3, NCS4, and/or NCS5) to control network planning, allocation, scheduling, and/or tuning of the vRAN/O-RAN.

In some implementations, an MLSS (MLSS9) is deployed on crewed vehicles 310 such as maintenance trucks, cars, taxis, emergency vehicles, delivery vehicles, air vehicles, etc., to provide sensing observations in their environments. This can be useful, for example, when performing cellular performance diagnostics, in which case MLSS9 can process sensing data from a wide variety of locations within the network from opportunistic platforms and determine metadata based on the sensing data. Based on the metadata, NCS9 and/or another NCS can help to enrich maintenance deployments/operations. For example, one or more NCS can obtain metadata from MLSS9, perform automated RF environment analyses based on the metadata, and identify one or more maintenance-related events such as equipment malfunctions.

In some implementations, an MLSS (MLSS10) and/or NCS (NCS10) is deployed on a tower 312, such as a radio tower or a surveillance tower, to provide monitoring of radio spectrum in an environment such as the peripheral of a facility, building, property, or protected region where the presence of new RF signal emitters (e.g., new vehicles or devices), an example of an event 122, may be a security risk or otherwise of interest. In situations where a user may be visually observing metadata output from ML and/or event data output from NCS10, direct feedback from the user can be used by MLSS10 and/or NCS to quickly (e.g., immediately in real-time) learn to operate better. For example, MLSS10 can identify the presence of a new emission in the RF power spectrum, and NCS10 can classify the emission as a Bluetooth signal that poses a security threat. An operator obtaining results from NCS10 can quickly provide simple "yes or no" feedback regarding the NCS10 results, and the feedback is fed back into the MLSS and/or NCS learning engine so that one or both can adapt, e.g., to not identify future Bluetooth emissions as security threats.

MLSS and/or NCS such as MLSS8/NCS8, MLSS9NCS9, and/or MLSS10/NCS10 can feed stored or streamed metadata and/or into a communications system, network, or infrastructure to help aggregate, visualize, and/or display the information in a concise way. In some cases, these module(s) can feed a RAN infrastructure to help the infrastructure improve various network parameters. For example, these MLSS can provide spatially-diverse observations (e.g., opportunistically from mobile UE locations), information about in- and out of-network emissions, propagation observations, interference observations, etc., with a diversity and/or volume of data that may not be compatible with RF detection only at network equipment such as RUs. In some implementations, distributed knowledge of propagation resulting from phenomena such as blockage, walls, etc., can lead to improved knowledge about MIMO user pairing and efficiency attainable with different beam configurations and multi-user beam patterns, helping facilitate (based on network control) better sum-rates and spectral efficiency in MIMO, Massive MIMO, and Distributed MIMO configurations as well as, in some implementations, better co-existence between emitters, users, and networks. For example, these MLSS can determine metadata which spatial modes cause interference to other users and elements in the network, based on which future scheduling and resource allocation can be performed. In some implementations, the metadata can be analyzed in concert with other RF and/or other emissions, such as visible light signals, infrared signals, acoustic signals, and/or other types of sensor data. Observations can be combined, and/or one observation may be used to tip and queue another type of observation.

Figure 4:
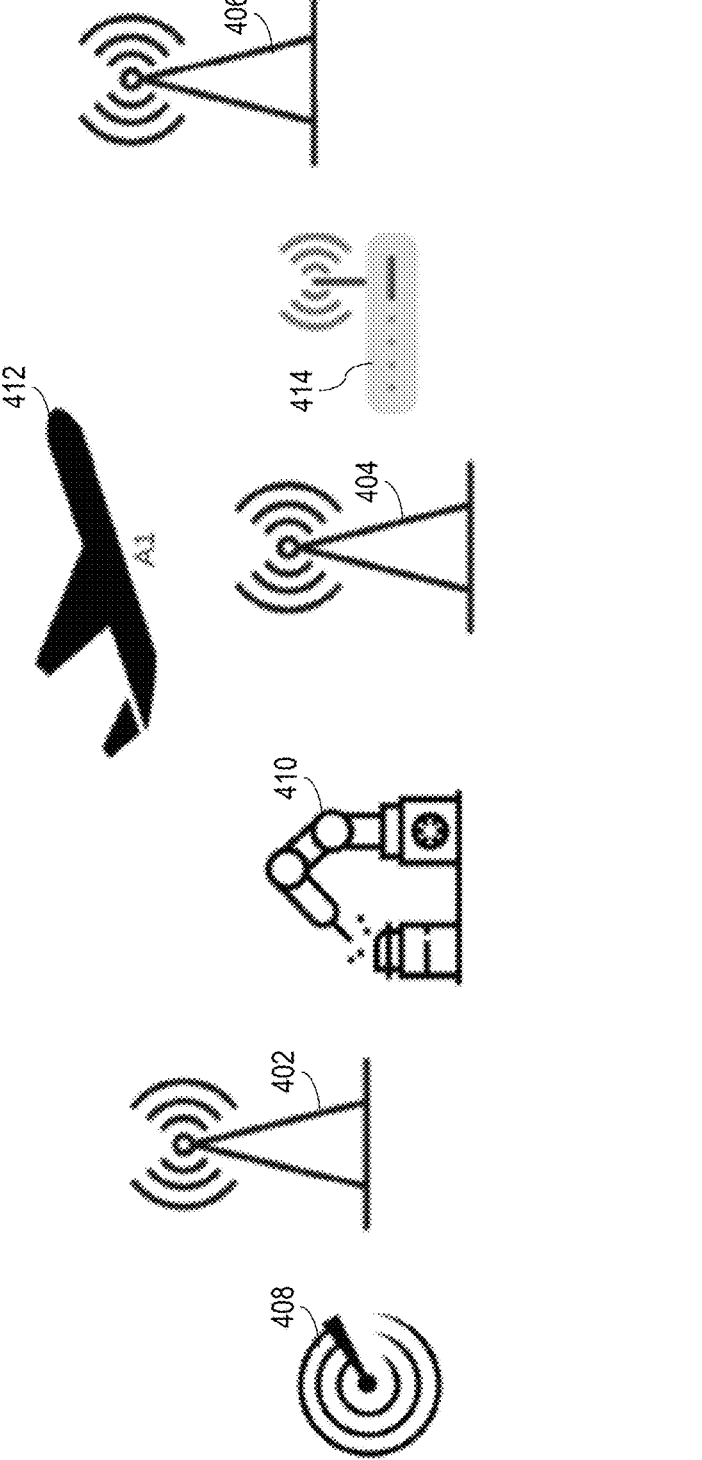
FIG. 4 is a diagram illustrating examples of RF interference.

RF interference detection and mitigation represent useful implementations of the present disclosure. As shown in FIG. 4, in a network environment 400, network devices 402, 404, 406 can represent, for example, RUs, UE, and/or network sectors. Interference can negatively affect wireless reception and/or processing by the network devices 402, 404, 406. By way of example, FIG. 4 illustrates several interference sources 408, 410, 412, 414. Source 414 represents an adjacent wireless system in the area, such as another network using unlicensed spectrum, e.g., Wi-Fi, NBWAN, cellular or another technology. Source 414 may be authorized or unauthorized and generates interference at the nearby devices 404 and 406, from an access point of the source 414 and/or from users of the access point. Source 412 represents an air vehicle such as an airplane which may either generate or receive interference due to emission; the interference is received at network device 404. An MLSS and/or NCS in network device 404 can reduce the negative effects of the interference. For example, an MLSS in network device 404 can generate metadata indicating high power levels in a particular band. An NCS in network device 404 or elsewhere can, based on the metadata, detect the presence of a radar altimeter of the source 412, and the NCS can cause network device 404 to reduce output power, pause operation, and/or alert a central network orchestrator as to the presence of nearby radio altimeter activity in the band which may post a risk to vehicle safety and/or network performance in the future. Source 408 represents a high powered radar system which may be permanent or temporarily located in the vicinity of the network, such as near network device 402. In this case, an MLSS in network device 402 generates metadata based on received signals from the source 408. An NCS in network device 402 or elsewhere can control operations of the network device 402 based on the metadata (e.g., based on identifying an interference event in the metadata), e.g., cause the network device 402 to change its power levels, its antenna configurations, its operating bands, a QoS and/or priority associated with wireless access by the network device 402, may cause predictive scheduling of spectrum resources (such as OFDM resource blocks) around an interference interval indicated by the metadata, and/or may cause a range of other actions to reduce interference. As a further example, industrial or other electronic or mechanical systems, such as a welding robot arm representing source 410, may emit sporadic interference across a wide range of radio bands when in operation. Awareness of this electromagnetic interference (EMI) based on metadata generated by MSSL of network devices 402 and/or 404 can allow for effective mitigation strategies to reduce disruption by the EMI of mission critical or high reliability systems, such as industrial manufacturing or factory systems. The mitigation strategies can include, for example, providing alerts/notifications of EMI sources; spatial and beam allocation control to avoid interference sources; reconfiguring or replacing physical devices or UEs within the operating environment such as a factory floor; by resource block allocation around the interfering EMI regions in the spectrum; hardening (e.g., re-training) ML-based encoding and decoding schemes against examples of the detected type of EMI for future transmissions; and/or adjusting other scheduling, MCS, power level, or frame parameters. The mitigation can be performed, for example, by one or more NCS.

Figure 5:
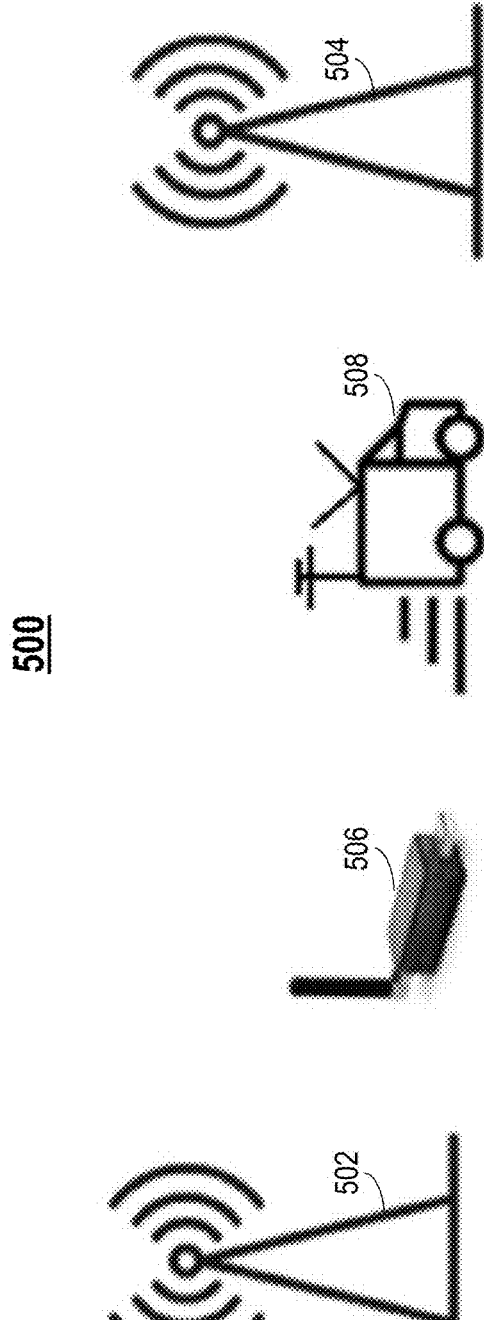
FIG. 5 is a diagram illustrating examples of security scenarios.

Security processes are further useful implementations of the present disclosure. An MLSS can generate messages to help alert systems, such as wireless networks and security within wireless networks, to threats, and can help to mitigate threats to the systems, such as by detecting RF activity and/or other unexpected changes in radio equipment. As shown in FIG. 5, in a network environment 500, two network devices 502, 504 (e.g., RUs) are equipped with MLSS modules. In this case, a first example of a security threat is that of an unauthorized wireless device 506. Device 506 has been introduced to a facility, area, or spectrum band in which it is not authorized to operate. Based on detection of the device 506 (as a detection event) by an NCS based on metadata generated by the MLSS on network device 502 (e.g., an NCS on network device 502 or another NCS), the NCS can trigger increased data and/or network security, such as putting in place a firewall, adjusting firewall settings, adjusting network access conditions, suppressing the unauthorized wireless device 506, or blocking the unauthorized wireless device 506 from network access. In some implementations, the NCS can block device(s) operating on bands on which one or more unauthorized devices have been detected. As another example, malicious actors, such as a rogue base station 508, may maliciously mis-identify themselves as authorized base stations, relays, or clients in order to disrupt, manipulate, or steal information from cellular or other wireless systems. In this case, an MLSS on network device 504 can generate metadata indicative of unexpected emissions, such as the presence of new access points of cellular downlink signals or IoT signals which should not be present in the network environment 500. In response, an NCS on network device 504 or another network module can identify the presence of the rogue base station 508 and cause one or more actions in response, e.g., blocking the rogue base station 508 from interfacing with the network.

Figures 6A, 6B:
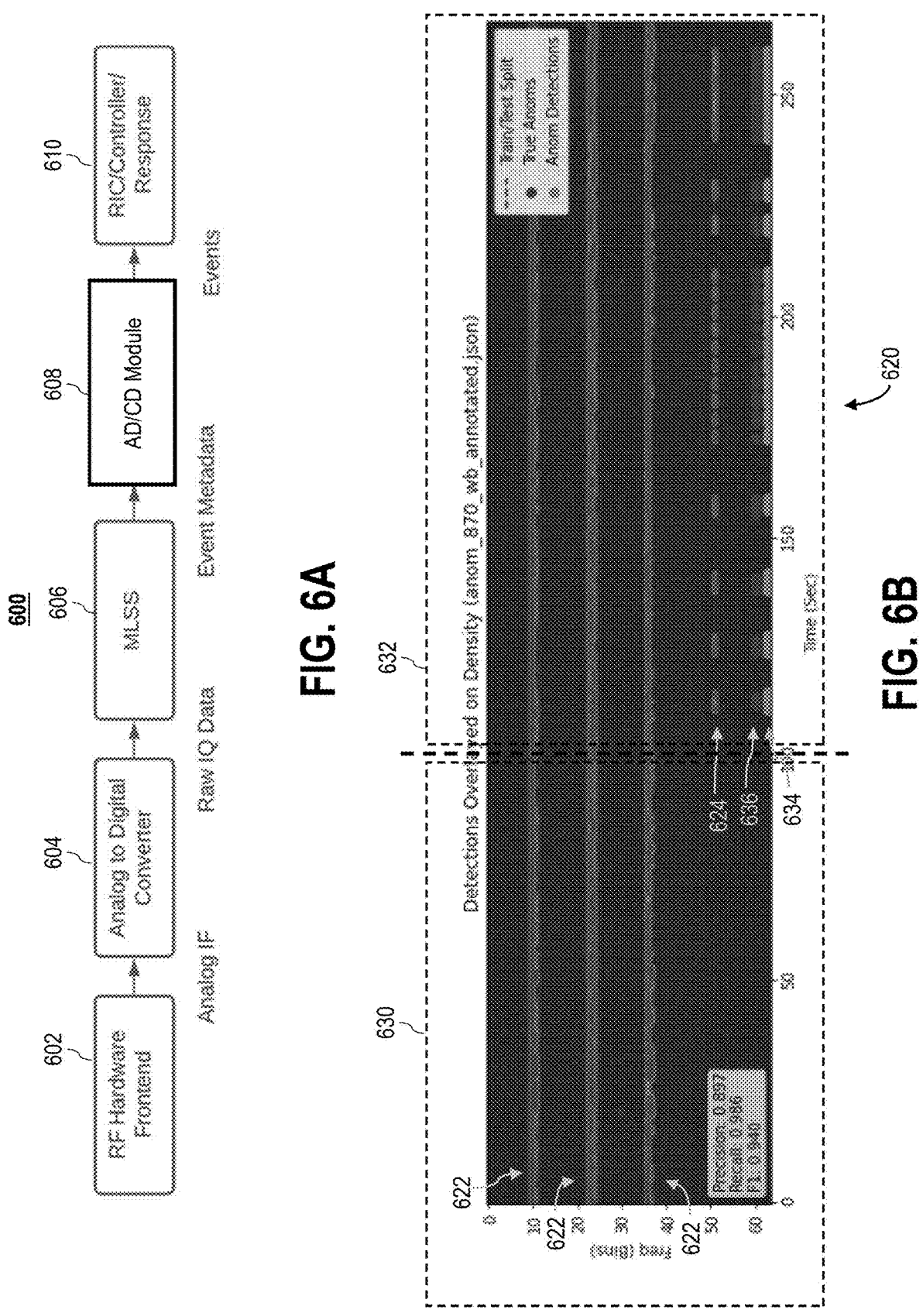
FIG. 6A is a diagram illustrating an example of a process for event detection.
FIG. 6B is a diagram illustrating an example of anomaly detection.

FIG. 6A illustrates an example of a process flow 600 for event detection (e.g., anomaly detection and change detection) within a radio frequency band utilizing an MLSS. Analog RF signals arrive at an RF hardware frontend 602, e.g., at one or more antennas of the RF hardware frontend 602. The RF hardware frontend 602 can be, for example, RF HW 204 of an RU 202, RF HW of a small cell base station 306, or an RF sensing system of any other detection device described herein, e.g., UE 302, sensing platform 308, crewed vehicle 310, tower 312, or network devices 402, 404, 502, 504. The analog IF data is provided into an ADC 604 (e.g., ADC 206 of RU 202) for conversion to a digital signal such as baseband/raw I/Q data. The baseband/raw I/Q data can be the input signal data 104 of FIG. 1. An MLSS (e.g., any of the MLSS described herein, such as any of the MLSS described in reference to FIGS. 1-5) obtains the I/Q data and determines metadata, e.g., as described in reference to FIG. 1. Instead, or additionally, the MLSS 606 can obtain another representation of RF data, e.g., OFDM grids. Data rates into the MLSS are generally relatively high rate. For example, full-rate fronthaul may be measured in 10s of gigabits per second, and periodic sampling of raw signal data may represents data input of 1s, 10s, or 100s of megabits per second of raw sample data. The metadata output of the MLSS 606, as described above, describes the RF activities and/or emissions present in the input signal data, such as one or more of: signal types, timings, frequencies, powers, protocols, directions of arrival, times and/or locations of signal emitters, etc., of one or more signals in the input signal data. The metadata can compactly represent activities in the RF environment, e.g., as a reduced-dimensional/reduced-size representation on the input signal data, such as ASN1, JSON or BSON detector output describing/representing the metadata. Accordingly, signal data input rates of at least several megabits per second, and up to 10s of gigabits per second, can be transformed into metadata output rates on the level of several kilobits per second, greatly reducing the bandwidth consumed.

In some implementations, the metadata describing activities in one or more RF bands is passed to an anomaly detection/change (AD/CD) module 608, which can be a hardware and/or software module. The AD/CD module 608 can be included in an NCS (e.g., any of the NCS described in reference to FIGS. 1-6), and/or can be included in the MLSS 606; as noted in reference to FIG. 1, one or more (e.g., any or all) NCS functions described herein can be integrated into the MLSS, without departing from the scope of this disclosure. The AD/CD module 608 can execute on, for example, a RIC xAPP, RIC rAPP, RIF zAPP, a cloud service, an edge processor, an RU, a DU, and/or be co-resident with the radio sensor having the RF hardware frontend 602, in various implementations. The AD/CD module 608 is configured to identify events such as anomalies and/or changes in underlying signals across at least a portion of one or more RF bands, such as the whole band. For example, the AD/CD module 608 can post-process the metadata to flag changes or deviations from normal band activity. Such changes can be determined with respect to a baseline set via explicit operator-controlled parameters, and/or can be determined using one or more machine learning networks of the AD/CD module 608. The machine learning networks can be trained using established baseline metadata and configured to identify sufficiently-significant changes from the baseline metadata. As described in reference to FIGS. 1-5, data indicative of one or more events can be used to control network operations, e.g., by providing the events data to a RIC, controller, or other module 610 configured to responsively control network operations.

In an example of a deployment, a MC application or cloud server running the AD/CD module 608 can receive metadata outputs from multiple MLSS feeds. For example, a MC xAPP on the MC 210 of FIG. 2 can receive metadata outputs from two or more of MLSS1, MLSS2, MLSS3, MLSS4, and MLSS5. In some implementations, the MC xAPP can receive metadata outputs from multiple MLSS on multiple corresponding RUs, e.g., in different geographic locations. In some implementations, the RIC xAPP is configured to aggregate the metadata outputs and perform analysis and change detection over multiple sensors and/or geographic locations.

A range of methods can be used by the AD/CD module 608 to flag changes in the distribution of the RF activity, as indicated by MLSS-output metadata. Methods used can include, for example, an isolation forest algorithm, a local outlier factor model, a covariance-based methods, a one-class support vector machine (SVM)-based method, and/or a stochastic gradient descent (SGD)-based method. Other methods that can be used by the AD/CD module 608 include, without limitation, time-series forecasting, deviation measurements from forecasts, reconstructive methods such as autoencoders, variational autoencoders (VAEs), generative-adversarial networks (GANs), machine learning methods (e.g., trained neural networks) and/or other such models, which attempt to model the distribution of the incoming data feed, or features or distributions derived therefrom, and to flag or alert when deviations or changes in this distribution occur. In some cases the inputs to these models may be N-dimensional feature densities or embeddings of the MLSS metadata. In some implementations, the metadata can include combined network key performance indicator (KPI) data such as UE signal strength, Reference Signal Received Power (RSRP), Channel Quality Indicator (CQI), Block Error Ratio (BLER), Received Signal Strength Indicator (RSSI), Signal to Interference & Noise Ratio (SINR), and/or the like.

In some implementations, the AD/CD module 608 (e.g., an NCS) performs one or both of two distinct roles. Anomaly detection is the act of determining if an RF emission is considered out-of-distribution (OOD), or otherwise does not reflect the normal activity seen in a band. These RF anomalies may pertain to activities like new emitters; emitters that have changed physical location or frequencies; or emitters with a waveform that has not been seen before. Algorithm approaches which can be used for anomaly detection by the AD/CD module 608 include clustering techniques, control charts, local outlier factor methods, and neural-network based techniques such as GANs, VAEs, and other classes of neural networks trained to receive input metadata and detect anomalies therein. Change detection includes monitoring changes in the signal distribution which may not be uniquely OOD, e.g., may not exceed a threshold for being identified as an anomaly. For example, a signal may turn off which is normally on, or is normally on at certain other times. As another example, network traffic or temporal/sequence behavior may indicate significant changes in band activity over time. Because, in some implementations, the AD/CD module 608 operates on metadata provided by the MLSS 606, bandwidth requirements for provisioning of data to the AD/CD module 608 can be reduced, compared to direct analysis of, for example, raw signal data.

Any of the events flagged by such an AD/CD module 608 may result in a response to the events. For example, the AD/CD module 608 can generate a message indicative of the event, the message passed to a controller to trigger the response. As another example, the AD/CD module 608 can be included in an NCS that itself performs network control based on detection of the events. For example, a RIC hosting the AD/CD module 608 in an xAPP, rAPP, or zAPP can control network operations using E2/RMR interfaces, e.g., to cause changes in RU or DU operation.

FIG. 6B illustrates an example of a signal density plot 620 of frequencies of observed signals. The signal densities are examples of metadata determined by the MLSS 606. Three relatively stable signals 622 at different frequencies are present throughout the observation window. However, shortly after 100 seconds into the observation, a new signal 624 appears. In an example of analysis by the AD/CD module 608, the AD/CD module 608 implements a VAE-based out-of-distribution approach to recognizing anomalies in the metadata distribution. The VAE is trained on a first portion 630 of metadata, as delimited by the indicated "Train/Test Split" line, and performs anomaly detection on a second portion 632 of metadata. The AD/CD module 608 determines time periods 634 (shown at the bottom of the plot 620) corresponding to out-of-distribution signals. Above the identified time periods 634 are ground truth timings 636 for anomalies, as recorded by the RF source which caused the anomalies. Precision, recall, and F1 scores indicate that the illustrated method is accurate in identifying in-distribution and out-of-distribution signals, e.g., with compatibility for relatively low bandwidth between the MLSS and the AD/CD module 608. Multiple MLSS processing functions can feed one or more AD/CD modules 608 with low bandwidth and data loads, making the approach scalable over a wide network of sensors such as a full-scale RAN or sets of dedicated sensors.

Figure 7:
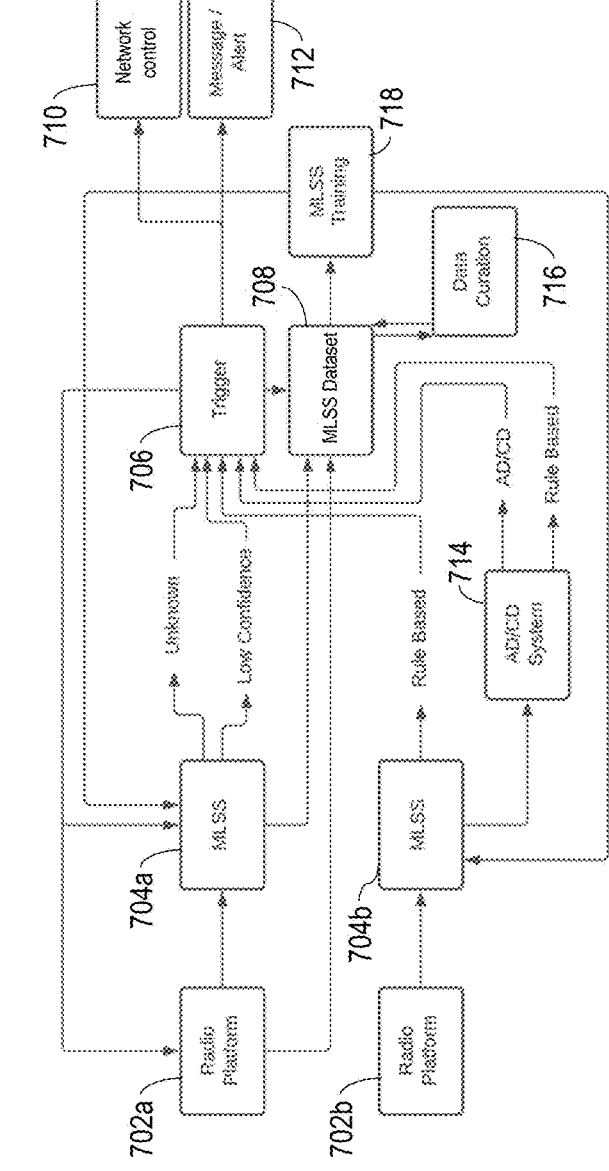
FIG. 7 is a diagram illustrating an example of a system including a machine learning sensing system.

FIG. 7 illustrates an example of a system 700 for monitoring of (and, in some implementations, training based on) anomalies and RF emission phenomena using MLSS applications across a set of radio platforms. The system 700 includes two radio platforms 702a and 702b, which can be RUs (e.g., RU 202), dedicated software-defined radios (SDRs), and/or any one or more of the deployment scenarios described herein, such as RIC 210, DU 212, cloud service 214, CU 230, UE 302, small cell base station 306, sensing platform 308, crewed vehicle 310, tower 312, and/or network devices 402, 404, 502, 504. Each of the radio platforms 702a, 702b feeds a respective MLSS application 704a, 704b running either on the same platform or on another platform (such as a RIC xAPP or rAPP or cloud service); the feeding can be performed over a protocol such as E2, as described in reference to FIG. 2. The MLSS applications 704a, 704b can have characteristics as described, for example, for MLSS modules in reference to FIGS. 1-2. Moreover, in some implementations, the MLSS applications 704a, 704b implement event detection, e.g., as described for NCS 120;

the events can trigger (706) operations, as examples of operation control by an MLSS/NCS as described in reference to FIGS. 1-6B.

The system 700 can be configured to identify and/or record certain activities in the RF spectrum for a wide range of reasons, including flagging anomalous, unique, unknown, confusing, and/or specific event types for further processing, further analysis, or further improvement of the model(s) (e.g., machine learning networks) used in the MLSS applications 704a, 704b.

Several examples of data paths in the system 700 which trigger operations (706) based on a detected event are illustrated. The operations can take various forms in different implementations. In some implementations, the operations include recording of input signal data and/or MLSS (and/or AD/CD) model output values, diagnostics, and/or metadata to add to an MLSS Dataset 708. In some implementations, the operations include control of network operations (710) (e.g., control of one or more RAN modules, such as control of an RF power level or an operating band), e.g., as described for various examples in reference to FIGS. 2-5. The network control can be performed, for example, by an NCS or by another application, e.g., a demodulator or an analytic routine. In some implementations, the operations include causing an alert or message to be sent (712) to a human, another automated RAN orchestration routine, and/or another system to take an action based on the detected event.

In some implementations, operations can be triggered based on low-confidence outputs, and/or other unknown/unclassified outputs, by the MLSS 704a. For example, if the MLSS 704a implements a model that executes with low confidence in the output, one or more of the described operations may be triggered. In some implementations, the metadata indicates detection of an unknown emission class (e.g., MLSS 704a determines that it has detected something new or unknown in the spectrum), which can trigger corresponding operations. In some implementations, the detection event includes satisfaction of one or more rule-based criteria (e.g., MLSS 704b determines that a specific type of signal has appeared, or that a detection signal emission meets a certain set of pre-defined criteria as determined by MLSS 704b, based on metadata). In some implementations, the detection event includes that an AD/CD system 714 (e.g., having characteristics as described for AD/CD module 608) has detected an anomaly event or a change event based on metadata output from MLSS 704b, and/or the AD/CD system 714 otherwise triggers in a way which meets a set of rules-based criteria. For example, high-level rules or triggers may be defined for detection of various anomalies or changes, such as changes or anomalies within specific known signals, sets of signals types, bands, physical location or regions, power levels, angles of arrival, activity patterns, times of day/week/year, statistical changes in signal properties, changes indicating unauthorized access or disruption such as anomalies in EMI, jamming, wireless attack signatures, and/or other signal and/or environmental properties. Changes and/or anomalies can be detected based on one or more of these criteria. Examples of rules include "detection of an after-hours Bluetooth signal" and "detection of an unknown signal in the 900 MHz band."

Each of these detection events represent certain events in the environment which may be rare, may reflect difficult model performance conditions (for example, high uncertainty in class, indication of out of distribution distance, unstable detection regions, etc.), and/or may reflect previously unseen or un-curated conditions which can be reviewed and used to re-train one or more machine learning networks of the MLSS 704a, 704b and/or AD/CD system 714 for the machine learning networks to understand in the future. For example, MLSS data corresponding to a detection event, added to MLSS Dataset 708, can be reviewed and curated (716) by a human (e.g., manual data inspection/labeling or various automated guiding rule sets or other protocol processing tools like demodulators), and/or can be reviewed and curated (716) by a set of automated routines or algorithms which analyze the detection event and/or the MLSS data, e.g., to determine a corresponding label. The label can indicate, for example, an RF emission type, a radio type, an example of EMI, an example of radar or jamming or malicious emissions, an example of a communication signals, and/or new activity in a band, any of which may be a new training input to the machine learning networks.

In an MLSS training process (718), labeled data in the MLSS Dataset 708 is provided back to MLSS 704a, 704b to improve the machine learning network(s) of the MLSS 704a, 704b (e.g., neural networks). Retraining is performed by leveraging labeled MLSS data to produce updated MLSS machine learning networks (e.g., to update weight values of the machine learning networks). The re-trained machine learning networks can then be deployed back to MLSS 704a, 704b for inference and improved operation in the future. An analogous process can instead, or additionally, be used to retrain one or more machine learning networks of the AD/CD system 714. In some implementations, the retraining can include fine-tuning an existing machine learning model, e.g., with extra model gradient updates steps or reinforcement style updates such as policy gradients or task rewards for fine tuning the data on various newly-detected anomalies.

Figure 8:
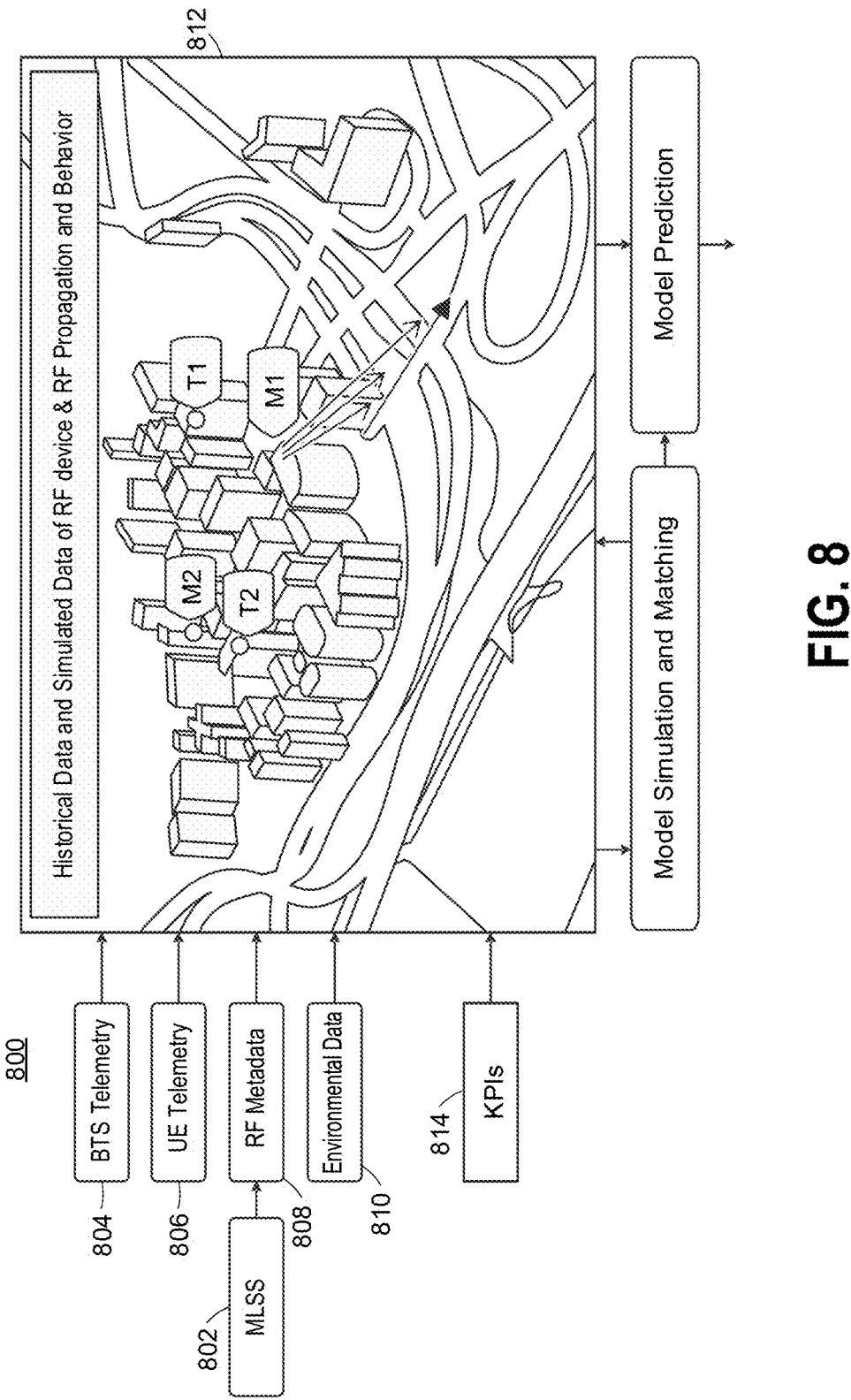
FIG. 8 is a diagram illustrating an example of a system including an environmental simulation.

In some implementations, RF metadata, provided by any one or more of the MLSS described herein, can be used to form a simulated version of an environment. A simulated version of an environment can be used to model RF device behavior and RF propagation behavior. Derived models can be used for simulation and optimization of communications systems. For example, FIG. 8 illustrates an example of a system 800 for environment simulation. In the system 800, RF emission metadata 808 from an MLSS 802 (e.g., any one or more of the MLSS described in reference to FIGS. 1-7) describes RF emissions detected at one or more platforms such as base stations, UE devices, vehicles, and/or UAVs. The emission metadata 808 is employed in conjunction with one or more other data sources such as base station (BTS) telemetry 804 describing the network environment in which the RF emissions were detected including, for example, cell locations, configurations, antenna configurations, past channel state information, past resource scheduling, and/or emission information; UE telemetry 806 (characterizing UE at which RF signals were detected for metadata determination) such as past locations, past tracks, emission schedules, receive signal strengths, RSSIs, RSRPs, and/or channel state information; and/or environmental data 810 describing the physical environment in which the RF emissions were detected such as geometries for urban cities, large bodies, roads, obstructions, and/or signal reflectors, which can change network statistics over time.

A simulated environment 812 is generated using all of or some subset of these data sources 804, 806, 808, 810. Generating the simulated environment 812 can include, for example, applying one or more propagation models such as ray tracing, tapped delay line (TDL) and/or clustered delay line (CDL) models, path loss models, GAN/VAE and/or other ML-based propagation models to data from the data sources 804, 806, 808, 801. The metadata 808 from the MLSS 802 allows the system 800 to leverage the data from the data sources 804, 806, 810. For example, because the metadata 808 transmitted from the MLSS 802 is compact (e.g., has smaller data/storage size than raw signal/emission data on which the metadata 808 is based), many sensors and many observations and locations can be rapidly combined into the simulated environment 812 to provide a rich set of measurement data which summarizes emitters present in the environment, locations of the emitters, signal strengths which can be used to infer propagation conditions, and/or pattern of life statistics about the emitters.

In some implementations, traditional network key performance indicators (KPIs) 814, such as RSRP, reference signal received quality (RSRQ), CQI, RSSI, BLER, bit error rate (BER), Error Vector Magnitude (EVM), and/or other metrics, can also be used to generate the simulated environment 812, based on the spatial and temporal history and distributions provided by these indicators. However, in some implementations, these indicators can be limited in the aspects they capture—for example, not capturing out-of-network emissions, unintended emissions or interference, non-serving cell or adjacent band or sector interference, and/or other emissions which may affect the spectrum performance and allocation within an environment. Accordingly, by combining traditional KPIs 814 with MLSS-derived metadata 808, a rich measurement-based digital representation of the real-world environment can be constructed.

Based on the simulated environment 812, statistical models can be obtained/generated. The models can predict, for example, signal propagation from specific locations to other locations, UE spatial distributions, predictions of spatial propagation conditions of certain emitters, RSSI and/or SINR levels expected for certain locations or paths for certain emitters, and/or other environment-based results. These models can be obtained through a variety of statistical techniques, including generative models such as GANs or VAEs (which can, for example, attempt to recreate a model or distribution from a sparse representation and a sparse set of observations or density of those observations) in order to model propagation expectations and interference expectations between UEs at different locations or different positions within a given portion of the simulated environment 812. For example, by leveraging the metadata 808, models can be trained to predict received strength(s) of many emitters and interference sources instead of, in or in addition to, simply characterizing in-network KPIs 814 of known base-stations.

In some implementations, models can be trained to localize sources of interference in wireless network(s) in the simulated environment 812. Interference can lead to degradation, service interruptions, and/or risks to networks or services. Because the RF metadata 808 can include signal properties (e.g., interfering signal properties) such as direction of arrival, impulse response, accurate time of arrival, and/or locations of emitters, these records can provide or include more information than traditional KPIs 814. A digital world representation that combines the RF metadata 808 with KPIs 814 from one or more originating platforms such as RUs, sensors, and/or UEs can help build an accurate measurement-based model for the propagation environment. In the example of FIG. 8, two cellular sectors (T1 and T2) and two mobile users (M1 and M2) are shown in the simulated environment 812. The cellular sectors and mobile users may be simulated based on the RF metadata 808 (and, in some implementations, KPIs 814) representing received signals, directions, signal strengths, and/or other signal properties. In some implementations, the cellular sectors and mobile users are simulated/predicted based on trained models, such as generative models or statistical models attempting to fit models for propagation, signal strength, and/or spatial behavior of signals and emitters based on the data sources. The simulated environment, sometimes referred to as a digital twin for the real propagation environment, or as a metaverse representation of propagation, can be used to conduct various model simulations to optimize the models to best match the data and observation from the data sources. For example, signal emission and/or reception from/to the mobile devices M1 and M2 can be simulated.

The models, generated based on the simulated environment 812, can model UE behavior and spatial distribution within various types of environment (e.g., a dense environment). In some implementations, the models can be used (e.g., in a RIC such as RIC 210) to determine scheduling, spatial multiplexing configurations, antenna or base station tuning, beam forming, spatial scheduling, and/or distribution of spectrum resources for users and allocations within a given sector. Model predictions can be fed to schedulers or to scheduler policies and other aspects within a RAN corresponding to the simulated environment 812 to improve the RAN's control and give the RAN better models fit to the actual propagation and statistics of the reflected physical real environment.

Further, in some implementations, the models can be used to generate channel distributions which can be used, for example, to train a variety of signal processing modules such as neural network-driven channel estimation or other L1 baseband processing algorithms. Such a data-driven environment model with accurate distributions reflecting the environment in many aspects of device behavior and propagation behavior and spatial behavior can allow for future data-driven air-interfaces such as the candidate 5G Advanced and 6G air interfaces, where such a data-rich historical and simulation environment can provide accurate models.

Various communications models which can be determined based on the metadata 808 include channel autoencoders, beam control algorithms, neural receiver algorithms, and channel state information (CSI) feedback algorithms. These algorithms can be included in an NCS and used by the NCS to determine one or more controls/adjustments to execute on the NCS's network.

Figure 9:
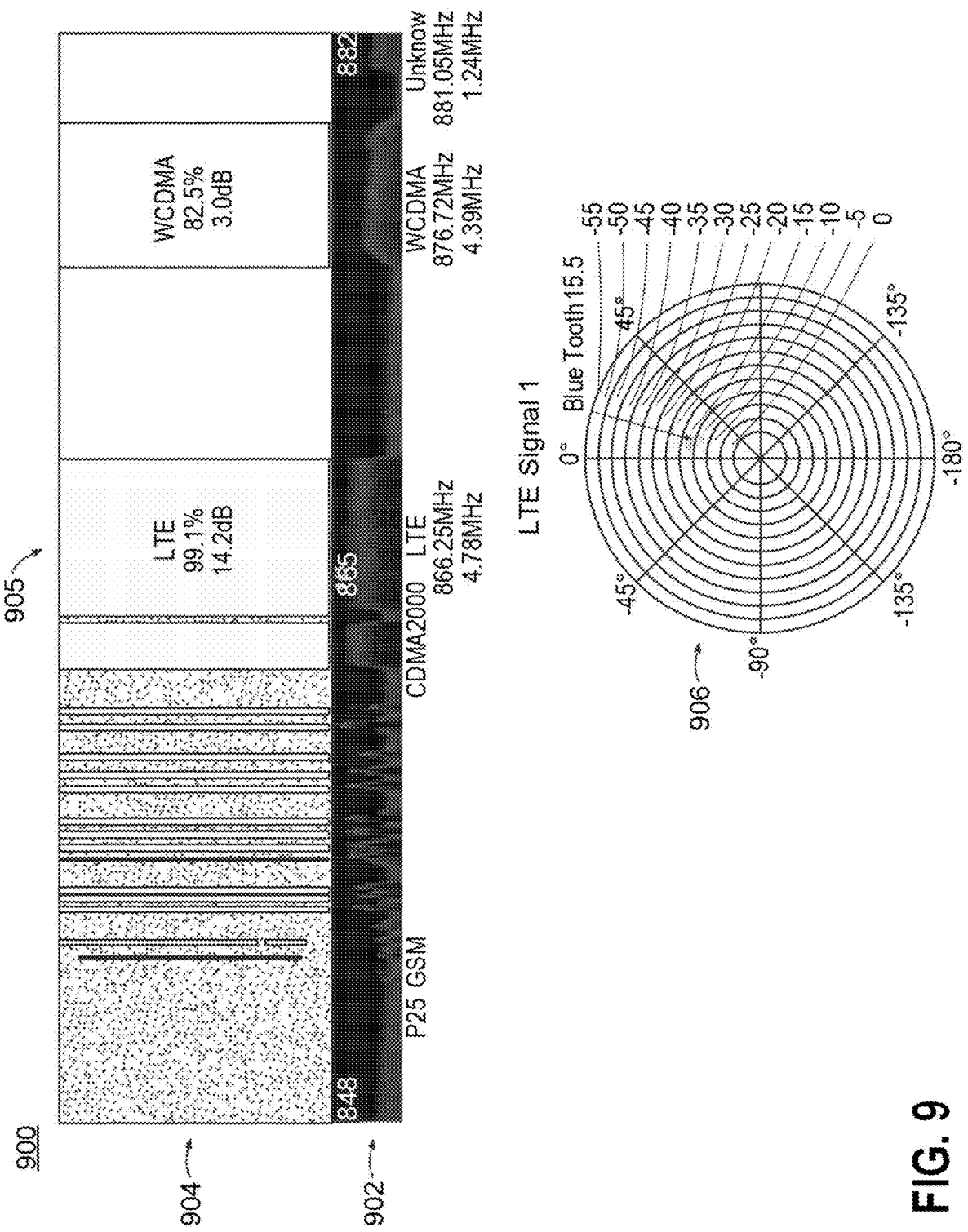
FIG. 9 is an example of a visual interface for displaying metadata.

Based on MLSS operations as described herein, various data visualizations can be generated. An example of a visual representation 900, as shown in FIG. 9, includes a power spectral density plot 902 of the input signal data as a color/heat-map, along with a spectrogram plot of power over time and frequency 904 which has been annotated with detection metadata represented by boxes and/or text. One such annotation is shown as box 905, which illustrates an LTE signal detection with estimated signal to noise level as well as signal type confidence as a percentage. A corresponding compass rose detecting graphic 906 illustrates the direction of arrival (azimuth) estimate for the LTE signal detection, estimating which direction that particular emission is coming from.

FIGS. 10-11 illustrate examples of processes 1000, 1100 according to some implementations of the present disclosure. The processes 1000, 1100 can be performed by single devices, modules, and/or computer systems (e.g., single network devices) or by combinations of devices, modules, and/or computer systems. For example, the processes 1000, 1100, and other processes derived therefrom or associated with the processes 1000, 1100, can be performed by a single one of the RU 202, the RIC 210, the DU 212, the cloud service 214, UE 302, the CU 230, small cell base station 306, sensing platform 308, crewed vehicle 310, tower 312, and/or network devices 402, 404, 502, 504, or by a combination of one or more of these modules, e.g., performing different respective portions of the processes 1000, 1100. A computer system to perform the processes 1000, 110 can include one or more of the RU 202, the RIC 210, the DU 212, the cloud service 214, UE 302, the CU 230, small cell base station 306, sensing platform 308, crewed vehicle 310, tower 312, and/or network devices 402, 404, 502, 504.

As shown in FIG. 10, a process 1000 includes obtaining, using a specified protocol of a radio access network, low-level signal data corresponding to a radio frequency (RF) signal processed in the radio access network (1002). For example, the protocol can be a built-in, pre-specified, or standard protocol of the radio access network that is used for obtaining low-level signal data such as I/Q data. For example, the low-level signal data can be obtained by a computing system of the RU 202 or a computing system of UE 302 or another sensing module, or can be obtained by another module (such as the RIC 210, the DU 212, the cloud service 214, or the CU 230) from a module that performs RF sensing such as the RU 202 or the UE 302.

The low-level signal data is provided as input to at least one machine learning network (1004). For example, the at least one machine learning network can include any of the MLSS described herein, e.g., MLSS 102. In some implementations, the at least one machine learning network includes a signal detection network and a metadata extraction network. In some implementations, the at least one machine learning network includes pre-processing and/or post-processing components. The at least one machine learning network (e.g., MLSS) can execute in any of the RF network modules and devices described herein, e.g., RU 202, the RIC 210, the DU 212, the cloud service 214, UE 302, the CU 230, small cell base station 306, sensing platform 308, crewed vehicle 310, tower 312, and/or network devices 402, 404, 502, 504.

In response to providing the low-level signal data as input to the at least one machine learning network, metadata is obtained as an output of the at least one machine learning network, the metadata providing information on one or more characteristics of the RF signal (1006). The metadata can include, for example, a reduced-size and/or reduced-dimensional representation of the RF signal or an aspect thereof. For example, the metadata can provide information on one or more of: signal types present in the RF signal (e.g., as a function of time); timings of signals present in RF signal; frequencies, powers, protocols, directions of arrival, and/or timings of the signals (for example, the power present in signals of various frequencies as a function of time, and/or locations of signal emitters, etc., of one or more signals in the RF signal data.

An operation of the radio access network is controlled based on the metadata (1008). For example, the controlled operation can include one or more of resource scheduling, band assignment, an antenna parameter, resource block avoidance, a modulation and coding scheme (MCS), spatial re-use, an emission frequency, an emission power, or a beam-steering setting. Controlling the operation of the radio access network can be performed by the same module(s) that obtain the low-level signal data and/or obtain the metadata output of the at least one machine learning network (e.g., the same module(s) that execute an MLSS), and/or can be performed by another network module. For example, in some implementations, the metadata is obtained using an MLSS executing on an RF signal receiving device such as the RU 202, UE 302, small cell base station 306, sensing platform 308, crewed vehicle 310, tower 312, and/or network devices 402, 404, 502, or 504, and control of radio network operation is performed by the RIC 210, the DU 212, the cloud service 214, or the CU 230. For example, the metadata, obtained by one or more of the former modules, can be transferred to one or more of the latter modules so that one or more of the latter modules can control the operation of the radio access network.

The process 1100 relates to obtaining the low-level signal data, e.g., as in element 1002 of the process 1000. The process 1100 includes providing a request for the low-level signal data on an interface of the radio access network, the request including a command associated with transfer of the low-level signal data from a radio unit (RU) of the radio access network to at least one of a distributed unit (DU), a central unit (CU), or a RAN intelligent controller (RIC) of the radio access network (1102). The low-level signal data is obtained based on the request (1104). The command (e.g., a standard query) can be based on a specified or built-in protocol or function of the radio access network, e.g., a standard command/function/query available throughout the radio access network based on an open framework such as O-RAN. For example, the request can be provided on an E2 interface of the O-RAN architecture. The low-level signal data thus obtained can include at least one of time-series I/Q data, frequency domain data, orthogonal frequency division multiplexing (OFDM) data, or cyclic prefix-orthogonal frequency division multiplexing (CP-OFDM) data, filter bank-based multicarrier (FBMC) data, and/or orthogonal time frequency space (OTFS) data.

Some implementations according to this disclosure, based on their analysis of low-level RF signal data, can provide advantageously flexible signal/event detection. For example, MLSS signal extraction is not limited to a fixed protocol, such as Wi-Fi or Bluetooth, or to a narrow frequency band. Rather, because low-level RF signal data is analyzed, signal(s) of any protocol, including an unknown protocol, can be detected, across a wide frequency band.

In some implementations, the high level of rich sensing information for in- and out of-network RF emitters provided by MLSS-derived metadata based on low-level RF signal data, as described herein, can allow for more accurate modeling of spatial-spectrum re-use and optimization for denser wireless systems and/or can allow for spectrum re-use in ways which are difficult or sub-optimal when using alternative approaches. Shared spectrum systems such as Citizens Broadband Radio Service Device (CBSD) networks and private 5G networks, as well as unlicensed technologies such as NR-U or LTE-U or other similar air interfaces, can use this rich information at the simulation level in order to better configure network and sector configurations for spectrum sharing and better re-use of spectrum. In some implementations, these functions may be performed within a SAS (Spectrum Access System) to help coordinate short-term spectrum licenses between primary, secondary, and unlicensed spectrum access users. These functions can instead or alternatively be performed for the orchestration of a single network within a licensed, shared, or unlicensed band of spectrum.

Figure 12:
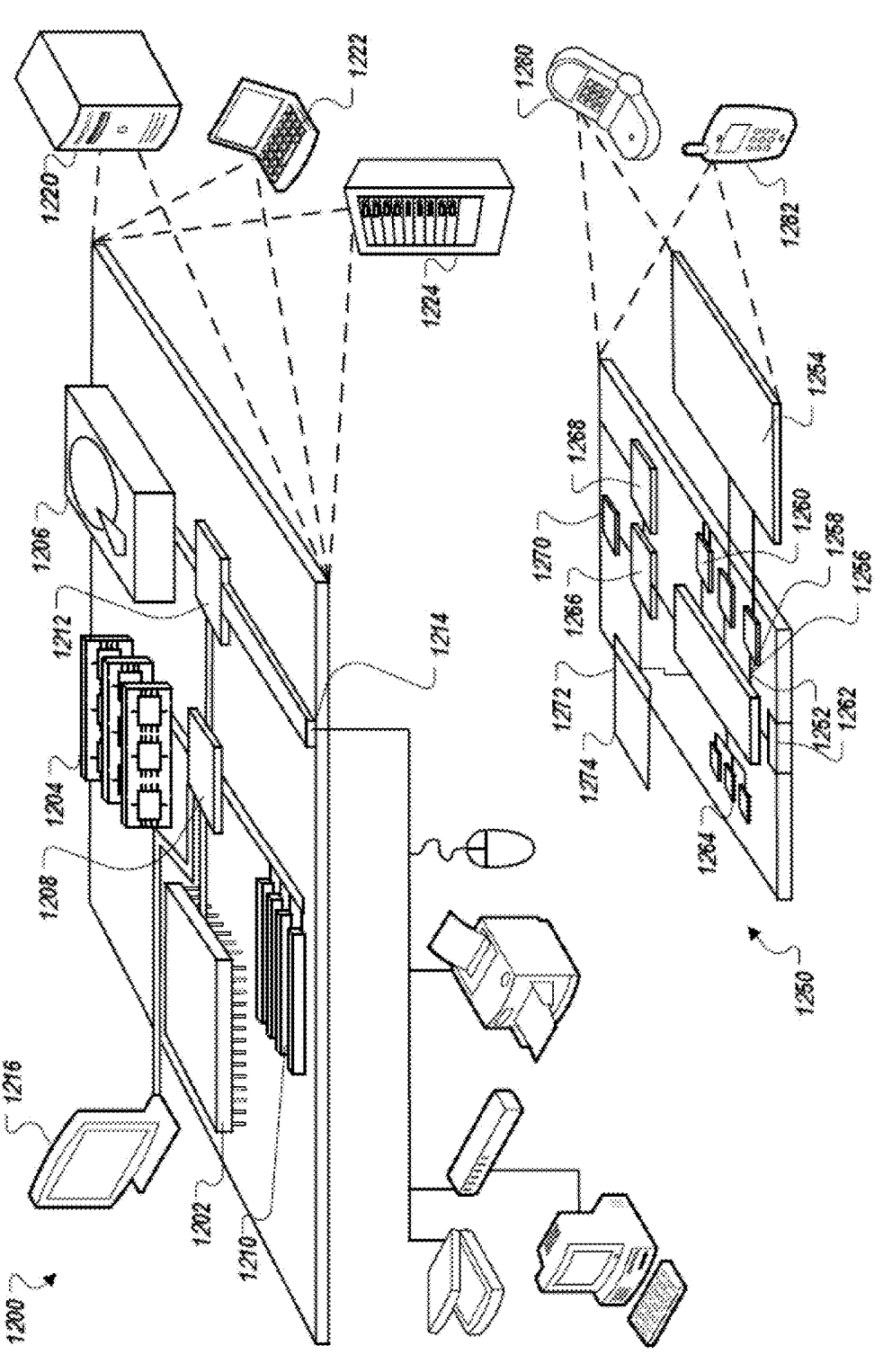
FIG. 12 is a diagram illustrating an example of a computer system.

FIG. 12 is a diagram illustrating an example of a computing system that may be used to implement one or more components of a system that performs learned communication over RF channels. The computer system illustrated in FIG. 12 can be, or can include, one or more of the network devices and modules described herein, e.g., the RU 202, the RIC 210, the DU 212, the cloud service 214, UE 302, the CU 230, small cell base station 306, sensing platform 308, crewed vehicle 310, tower 312, and/or network devices 402, 404, 502, 504.

The computing system includes computing device 1200 and a mobile computing device 1250 that can be used to implement the techniques described herein. For example, either or both of the computing device 1250 can execute an MLSS and/or NCS, and/or can control network operations based on determined metadata/events. For example, the mobile computing device 1250 can represent RU 202, UE 302, the CU 230, small cell base station 306, sensing platform 308, crewed vehicle 310, tower 312, and/or network devices 402, 404, 502, 504, and the computing device 1200 can include the RU 202, the MC 210, the DU 212, cloud service 214, UE 302, and/or the CU 230.

The computing device 1200 is intended to represent various forms of digital computers, such as laptops, desktops, workstations, personal digital assistants, servers, blade servers, mainframes, back-end network equipment, and other appropriate computers. The mobile computing device 1250 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 1202 is a single-threaded processor. In some implementations, the processor 1202 is a multi-threaded processor. In some implementations, the processor 1202 is a quantum computer.

The memory 1204 stores information within the computing device 1200. In some implementations, the memory 1204 is a volatile memory unit or units. In some implementations, the memory 1204 is a non-volatile memory unit or units. The memory 1204 may also be another form of computer-readable medium, such as a magnetic or optical disk.

The storage device 1206 is capable of providing mass storage for the computing device 1200. In some implementations, the storage device 1206 is or includes a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1202), perform one or more methods, such as those described above. The instructions can also be stored by one or more storage devices such as computer- or machine-readable mediums (for example, the memory 1204, the storage device 1206, or memory on the processor 1202). The high-speed interface 1208 manages bandwidth-intensive operations for the computing device 1200, while the low-speed interface 1212 manages lower bandwidth-intensive operations. Such allocation of functions is an example only. In some implementations, the high-speed interface 1208 is coupled to the memory 1204, the display 1216 (e.g., through a graphics processor or accelerator), and to the high-speed expansion ports 1210, which may accept various expansion cards (not shown). In the implementation, the low-speed interface 1212 is coupled to the storage device 1206 and the low-speed expansion port 1214. The low-speed expansion port 1214, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. In addition, it may be implemented in a personal computer such as a laptop computer 1222. It may also be implemented as part of a rack server system 1224. Alternatively, components from the computing device 1200 may be combined with other components in a mobile device (not shown), such as a mobile computing device 1250. Each of such devices may include one or more of the computing device 1200 and the mobile computing device 1250, and an entire system may be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 may also be provided with a storage device, such as a micro-drive or other device, to provide additional storage. Each of the processor 1252, the memory 1264, the display 1254, the communication interface 1266, and the transceiver 1268, are interconnected using various buses, and several of the components may be mounted on a common motherboard or in other manners as appropriate.

The processor 1252 can execute instructions within the mobile computing device 1250, including instructions stored in the memory 1264. The processor 1252 may be implemented as a chipset of chips that include separate and multiple analog and digital processors. The processor 1252 may provide, for example, for coordination of the other components of the mobile computing device 1250, such as control of user interfaces, applications run by the mobile computing device 1250, and wireless communication by the mobile computing device 1250.

The processor 1252 may communicate with a user through a control interface 1258 and a display interface 1256 coupled to the display 1254. The display 1254 may be, for example, a TFT (Thin-Film-Transistor Liquid Crystal Display) display or an OLED (Organic Light Emitting Diode) display, or other appropriate display technology. The display interface 1256 may include appropriate circuitry for driving the display 1254 to present graphical and other information to a user. The control interface 1258 may receive commands from a user and convert them for submission to the processor 1252. In addition, an external interface 1262 may provide communication with the processor 1252, so as to enable near area communication of the mobile computing device 1250 with other devices. The external interface 1262 may provide, for example, for wired communication in some implementations, or for wireless communication in other implementations, and multiple interfaces may also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 may also be provided and connected to the mobile computing device 1250 through an expansion interface 1272, which may include, for example, a SIMM (Single In Line Memory Module) card interface. The expansion memory 1274 may provide extra storage space for the mobile computing device 1250, or may also store applications or other information for the mobile computing device 1250. Specifically, the expansion memory 1274 may include instructions to carry out or supplement the processes described above, and may include secure information also. Thus, for example, the expansion memory 1274 may be provide as a security module for the mobile computing device 1250, and may be programmed with instructions that permit secure use of the mobile computing device 1250. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 1252), perform one or more methods, such as those described above. The instructions can also be stored by one or more storage devices, such as one or more computer- or machine-readable mediums (for example, the memory 1264, the expansion memory 1274, or memory on the processor 1252). In some implementations, the instructions are received in a propagated signal, for example, over the transceiver 1268 or the external interface 1262.

The mobile computing device 1250 may communicate wirelessly through the communication interface 1266 (e.g., with the computing device 1200), which may include digital signal processing circuitry where appropriate. The communication interface 1266 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 1268 using a radio frequency. In addition, short-range communication may occur, such as using a Bluetooth, Wi-Fi, or other such transceiver (not shown). In addition, a GPS (Global Positioning System) receiver module 1270 may provide additional navigation- and location-related wireless data to the mobile computing device 1250, which may be used as appropriate by applications running on the mobile computing device 1250.

The mobile computing device 1250 may also communicate audibly using an audio codec 1260, which may receive spoken information from a user and convert it to usable digital information. The audio codec 1260 may likewise generate audible sound for a user, such as through a speaker, e.g., in a handset of the mobile computing device 1250. Such sound may include sound from voice telephone calls, may include recorded sound (e.g., voice messages, music files, etc.) and may also include sound generated by applications operating on the mobile computing device 1250.

The mobile computing device 1250 may be implemented in a number of different forms, as shown in the figure. For example, it may be implemented as a cellular telephone 1280. It may also be implemented as part of a smart-phone 1282, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A number of implementations have been described. Nevertheless, it will be understood that various modifications may be made. For example, although various examples have been described in reference to cellular networks (e.g., cellular RAN architectures such as vRAN/O-RAN), the described MLSS-related systems and processes can be deployed in various other network contexts, such as Wi-Fi, Bluetooth, wireless LANs, and/or other RF environments. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:

obtaining, using a specified protocol of a radio access network, low-level signal data corresponding to a radio frequency (RF) signal processed in the radio access network;

executing at least one machine learning network in a radio unit (RU) of the radio access network, wherein executing the at least one machine learning network comprises providing the low-level signal data as input to the at least one machine learning network;

in response to providing the low-level signal data as input to the at least one machine learning network, obtaining, as an output of the at least one machine learning network, metadata providing information on one or more characteristics of the RF signal;

transferring the metadata from the RU to at least one of a distributed unit (DU), a central unit (CU), or a RAN intelligent controller (RIC) of the radio access network; and controlling, from the at least one of the DU, the CU, or the RIC, an operation of the radio access network based on the metadata.

2. The method of claim 1, wherein obtaining the low-level signal data comprises:

providing a request for the low-level signal data on an interface of the radio access network, the request comprising a command associated with transfer of the low-level signal data from the RU to one or more of the DU, the CU, or the RIC; and obtaining the low-level signal data at the one or more of the DU, the CU, or the RIC based on the request.

3. The method of claim 2, wherein the radio access network has an Open RAN (O-RAN) architecture, and wherein providing the request comprises providing the request on an E2 interface of the O-RAN architecture.

4. The method of claim 2, wherein the command is a query in a standard protocol of the radio access network.

5. The method of claim 1, wherein controlling the operation of the radio access network based on the metadata is performed by a zAPP, an xAPP, or an rAPP of the RIC.

6. The method of claim 1, wherein obtaining the low-level signal data comprises at least one of:

obtaining orthogonal frequency division multiplexing (OFMD) grid data originating at the DU, or providing a call to a management plane of the radio access network to obtain the low-level signal data.

7. The method of claim 1, wherein the low-level signal data comprises at least one of time-series I/Q data, frequency domain data, orthogonal frequency division multiplexing (OFDM) data, cyclic prefix-orthogonal frequency division multiplexing (CP-OFDM) data, filter bank-based multicarrier (FBMC) data, or orthogonal time frequency space (OTFS) data.

8. The method of claim 1, wherein controlling the operation of the radio access network comprises controlling at least one of resource scheduling, band assignment, an antenna parameter, resource block avoidance, a modulation and coding scheme (MCS), spatial re-use, an emission frequency, an emission power, or a beam-steering setting.

9. The method of claim 1, wherein the metadata comprises at least one of a signal type present in the RF signal, a direction of travel of the RF signal or a component thereof, a location of an emitter of the RF signal or a component thereof, a time of emission of the RF signal or a component thereof, a power of the RF signal or a component thereof, or a protocol of the RF signal or a component thereof.

10. The method of claim 1, comprising, based on the metadata, identifying at least one event comprising at least one of:

a presence of a mobile device interfacing with the radio access network, an anomaly in the RF signal, or an out-of-distribution change in the RF signal.

11. The method of claim 10, wherein identifying the anomaly comprises:

training a second machine learning network on first signal data, the first signal data lacking the anomaly; and applying the second machine learning network to the low-level signal data to identify the anomaly.

12. The method of claim 11, wherein the second machine learning network comprises an autoencoder.

13. The method of claim 10, wherein the anomaly comprises a presence of a new emitter represented in the low-level signal data.

14. The method of claim 1, comprising:

at the RIC, receiving, from a plurality of devices interfacing with the radio access network, a plurality of metadata providing information on RF signals received at the plurality of devices, and controlling the operation of the radio access network based on the plurality of metadata.

15. The method of claim 1, comprising:

identifying a component signal in the low-level signal data using a signal detection machine learning network;

providing data representative of the component signal as input to a metadata extraction machine learning network; and determining one or more characteristics of the component signal using the metadata extraction machine learning network.

16. The method of claim 1, comprising:

based on the metadata, identifying a presence of interference in the low-level signal data; and based on identifying the presence of the interference, adjusting a configuration of a network device in a vicinity of an emitter of the interference, to mitigate effects of the interference.

17. The method of claim 1, comprising:

identifying an event based on the metadata;

based on identifying the event, labeling the low-level signal data; and updating the at least one machine learning network using the labeled low-level signal data.

18. The method of claim 1, comprising:

generating a simulation of an environment of the radio access network using the metadata.

19. The method of claim 1, wherein the at least one machine learning network comprises:

a first machine learning network configured to identify a component signal in the low-level signal data; and a second machine learning network configured to determine the metadata based on the component signal.

20. The method of claim 1, wherein controlling the operation of the radio access network comprises controlling at least one of a multiple-input multiple-output (MIMO) configuration of the radio access network or a beam setting of the radio access network based on metadata associated with an emitter of a component of the RF signal.

21. A method comprising:

obtaining, using a specified protocol of a radio access network, low-level signal data corresponding to a radio frequency (RF) signal processed in the radio access network;

providing the low-level signal data as input to at least one machine learning network executed in the radio access network;

in response to providing the low-level signal data as input to the at least one machine learning network, obtaining, as an output of the at least one machine learning network, metadata providing information on one or more characteristics of the RF signal;

controlling an operation of the radio access network based on the metadata; and based on the metadata, identifying at least one event comprising an anomaly in the RF signal, wherein identifying the anomaly comprises:

training a second machine learning network on first signal data, the first signal data lacking the anomaly; and applying the second machine learning network to the low-level signal data to identify the anomaly.

22. The method of claim 21, wherein obtaining the low-level signal data comprises:

providing a request for the low-level signal data on an interface of the radio access network, the request comprising a command associated with transfer of the low-level signal data from a radio unit (RU) of the radio access network to at least one of a distributed unit (DU), a central unit (CU), or a RAN intelligent controller (RIC) of the radio access network; and obtaining the low-level signal data based on the request.

23. The method of claim 21, wherein the low-level signal data comprises at least one of time-series I/Q data, frequency domain data, orthogonal frequency division multiplexing (OFDM) data, cyclic prefix-orthogonal frequency division multiplexing (CP-OFDM) data, filter bank-based multicarrier (FBMC) data, or orthogonal time frequency space (OTFS) data.

24. The method of claim 21, wherein the second machine learning network comprises an autoencoder.

25. A method comprising:

obtaining, using a specified protocol of a radio access network, low-level signal data corresponding to a radio frequency (RF) signal processed in the radio access network;

providing the low-level signal data as input to at least one machine learning network executed in the radio access network;

in response to providing the low-level signal data as input to the at least one machine learning network, obtaining, as an output of the at least one machine learning network, metadata providing information on one or more characteristics of the RF signal;

controlling an operation of the radio access network based on the metadata; and based on the metadata, identifying at least one event comprising an anomaly in the RF signal, wherein the anomaly comprises a presence of a new emitter represented in the low-level signal data.

26. The method of claim 25, wherein obtaining the low-level signal data comprises:

providing a request for the low-level signal data on an interface of the radio access network, the request comprising a command associated with transfer of the low-level signal data from a radio unit (RU) of the radio access network to at least one of a distributed unit (DU), a central unit (CU), or a RAN intelligent controller (RIC) of the radio access network; and obtaining the low-level signal data based on the request.

27. The method of claim 25, wherein the low-level signal data comprises at least one of time-series I/Q data, frequency domain data, orthogonal frequency division multiplexing (OFDM) data, cyclic prefix-orthogonal frequency division multiplexing (CP-OFDM) data, filter bank-based multicarrier (FBMC) data, or orthogonal time frequency space (OTFS) data.

28. The method of claim 25, wherein obtaining the low-level signal data comprises at least one of:

obtaining orthogonal frequency division multiplexing (OFMD) grid data originating at a distributed unit (DU) of the radio access network, or providing a call to a management plane of the radio access network to obtain the low-level signal data from a radio unit (RU) of the radio access network.

29. The method of claim 25, comprising executing the at least one machine learning network on a RAN intelligent controller (RIC) or on a distributed unit (DU) of the radio access network.

30. A method comprising:

obtaining, using a specified protocol of a radio access network, low-level signal data corresponding to a radio frequency (RF) signal processed in the radio access network;

providing the low-level signal data as input to a signal detection machine learning network executed in the radio access network;

in response to providing the low-level signal data as input to the signal detection machine learning network, obtaining, as an output of the signal detection machine learning network, a component signal in the low-level signal data;

providing data representative of the component signal as input to a metadata extraction machine learning network executed in the radio access network;

in response to providing the data representative of the component signal as input to the metadata extraction machine learning network, obtaining, as an output of the metadata extraction machine learning network, metadata providing information on one or more characteristics of the RF signal; and controlling an operation of the radio access network based on the metadata.

31. The method of claim 30, wherein the output of the signal detection machine learning network comprises a timing associated with the component signal.

32. The method of claim 30, wherein the output of the signal detection machine learning network comprises an emission location of the component signal.

33. The method of claim 30, wherein the metadata comprises at least one of a signal type of the component signal, a direction of travel of the component signal, a location of an emitter of the component signal, a time of emission of the component signal, a power of the component signal, or a protocol of the component signal.

34. The method of claim 30, wherein obtaining the low-level signal data comprises:

providing a request for the low-level signal data on an interface of the radio access network, the request comprising a command associated with transfer of the low-level signal data from a radio unit (RU) of the radio access network to at least one of a distributed unit (DU), a central unit (CU), or a RAN intelligent controller (RIC) of the radio access network; and obtaining the low-level signal data based on the request.

35. The method of claim 30, wherein the low-level signal data comprises at least one of time-series I/Q data, frequency domain data, orthogonal frequency division multiplexing (OFDM) data, cyclic prefix-orthogonal frequency division multiplexing (CP-OFDM) data, filter bank-based multicarrier (FBMC) data, or orthogonal time frequency space (OTFS) data.

36. A method comprising:

obtaining, using a specified protocol of a radio access network, low-level signal data corresponding to a radio frequency (RF) signal processed in the radio access network;

providing the low-level signal data as input to at least one machine learning network executed in the machine learning network;

in response to providing the low-level signal data as input to the at least one machine learning network, obtaining, as an output of the at least one machine learning network, metadata providing information on one or more characteristics of the RF signal;

controlling an operation of the radio access network based on the metadata; and based on the metadata, identifying at least one event comprising an anomaly in the RF signal, wherein the anomaly comprises a presence of a new emitter represented in the low-level signal data, wherein the at least one machine learning network comprises:

a first machine learning network configured to identify a component signal in the low-level signal data; and a second machine learning network configured to determine the metadata based on the component signal.

37. The method of claim 36, wherein the metadata comprises at least one of a signal type of the component signal, a direction of travel of the component signal, a location of an emitter of the component signal, a time of emission of the component signal, a power of the component signal, or a protocol of the component signal.

38. The method of claim 36, wherein obtaining the low-level signal data comprises:

providing a request for the low-level signal data on an interface of the radio access network, the request comprising a command associated with transfer of the low-level signal data from a radio unit (RU) of the radio access network to at least one of a distributed unit (DU), a central unit (CU), or a RAN intelligent controller (RIC) of the radio access network; and obtaining the low-level signal data based on the request.

39. The method of claim 36, wherein the low-level signal data comprises at least one of time-series I/Q data, frequency domain data, orthogonal frequency division multiplexing (OFDM) data, cyclic prefix-orthogonal frequency division multiplexing (CP-OFDM) data, filter bank-based multicarrier (FBMC) data, or orthogonal time frequency space (OTFS) data.

40. The method of claim 36, comprising executing the at least one machine learning network on user equipment interfacing with the radio access network.

* * * * *